United States Patent
Park

(10) Patent No.: US 9,760,645 B1
(45) Date of Patent: Sep. 12, 2017

(54) SYSTEM AND METHOD FOR INTELLIGENTLY MANAGING AND DISTRIBUTING ELECTRONIC BUSINESS CARDS

(71) Applicant: Young Ryong Park, Savannah, GA (US)

(72) Inventor: Young Ryong Park, Savannah, GA (US)

( * ) Notice: Subject to any disclaimer, the term of this patent is extended or adjusted under 35 U.S.C. 154(b) by 0 days.

(21) Appl. No.: 15/152,545

(22) Filed: May 11, 2016

(51) Int. Cl.
| | |
|---|---|
| *G06F 17/00* | (2006.01) |
| *G06F 17/30* | (2006.01) |
| *G06K 19/06* | (2006.01) |
| *G06K 7/14* | (2006.01) |
| *H04L 29/08* | (2006.01) |
| *G06F 17/24* | (2006.01) |
| *G06F 3/0484* | (2013.01) |
| *G06F 3/0482* | (2013.01) |

(52) U.S. Cl.
CPC ...... *G06F 17/30879* (2013.01); *G06F 3/0482* (2013.01); *G06F 3/04847* (2013.01); *G06F 17/243* (2013.01); *G06K 7/1417* (2013.01); *G06K 19/06037* (2013.01); *H04L 67/18* (2013.01)

(58) Field of Classification Search
CPC ....... G06Q 30/02; G06Q 30/301; G07F 7/122
USPC ........................................ 235/375, 380, 385
See application file for complete search history.

(56) References Cited

U.S. PATENT DOCUMENTS

| | | |
|---|---|---|
| 6,269,369 B1 | 7/2001 | Robertson |
| 8,364,711 B2 | 1/2013 | Wilkins |
| 2002/0116396 A1 | 8/2002 | Somers et al. |

(Continued)

*Primary Examiner* — Daniel St Cyr
(74) *Attorney, Agent, or Firm* — Singh Law Firm PLLC; Gautam B. Singh

(57) ABSTRACT

An invention for managing and distributing electronic business cards is disclosed. The system and the methods disclosed utilize a centralized database for managing contact information and make this contact information available as an electronic business card available online for others to view and subscribe using an convenient token such as QR-Code or Bar-Code. Another aspect of the invention is the ownership of the contact information is with the owner of the business card who is responsible for keeping it updated and making the most current information visible to subscribers. A recipient subscribes to an electronic business card by adding a link to the electronic card in their address book referencing which results in the retrieval of the most current and up-to-date contact information from the centralized database. This relieves the subscribers, or the recipients of the business card, from the onus of updating the card owner's information on their local copy. Information is accessed from the database over the network ensuring that the information seen by recipient is never stale. The system also provides the capability for card owners to define their own customized fields for storing their specialized, idiosyncratic, or locale specific contact information. Furthermore, card owners can create groups of their subscribers and control the attributes or the elements of their contact information that are visible to subscribers in a groups. The system also supports push notifications that are sent out to subscribers when card owner makes a change to their centrally stored contact information.

21 Claims, 17 Drawing Sheets

(56) References Cited

U.S. PATENT DOCUMENTS

| | | | |
|---|---|---|---|
| 2005/0044423 A1* | 2/2005 | Mellmer | G06F 21/31 |
| | | | 726/4 |
| 2006/0136251 A1* | 6/2006 | Sung | G06Q 10/107 |
| | | | 709/206 |
| 2007/0266156 A1* | 11/2007 | Wilkins | G06F 17/30879 |
| | | | 709/225 |
| 2009/0164589 A1* | 6/2009 | Shroff | G06Q 10/10 |
| | | | 709/206 |
| 2011/0258159 A1* | 10/2011 | Mitchell | H04M 1/274516 |
| | | | 707/613 |
| 2011/0271108 A1* | 11/2011 | Kale | G06F 21/10 |
| | | | 713/168 |

* cited by examiner

|  | Public | Group₁ | Group₂ |
|---|---|---|---|
| Attribute₁ | ✓ | | |
| Attribute₂ | | ✓ | |
| Attribute₃ | | | ✓ |
| Attribute₄ | ✓ | | |
| ⋮ | ⋮ | ⋮ | ⋮ |
| Attribute_N | | ✓ | ✓ |

FIG. 10

GROUP PERMISSIONS

| | | | |
|---|---|---|---|
| User Name | John Smith | Groups | WORK ▼ |
| | | | Family |
| Member Since | 01/01/2015 | | Friends |
| Creation Date | 02/01/2016 | Description | Work related contact details. |
| EMail Address | jsmith@net.com | | |

| Attribute | Include? |
|---|---|
| Name | ▦ |
| Email | ▦ |
| Home Phone | ✕ |
| Cell Phone | ✕ |
| Work Phone | ⊙ |
| Home Address | ✕ |
| Work Address | ⊙ |
| Department | ⊙ |
| Work EMail | ⊙ |
| Mail Stop | ⊙ |
| Personal E-Mail | ✕ |
| Secretary Extension | ⊙ |
| Skype Username | ✕ |

} Public Attributes

FIG. 11

SYSTEM AND METHOD FOR INTELLIGENTLY MANAGING AND DISTRIBUTING ELECTRONIC BUSINESS CARDS

FIELD OF THE INVENTION

The present invention relates to system and method for a global centralized management of personally customized contact information and for controlling its access, dissemination and augmentation with contact specific notes and reminders.

BACKGROUND OF THE INVENTION

In the business world, a business card is a very important tool for people to interact with customers to introduce your products, services or yourself. Physical business cards are ubiquitous and typically provide personal contact information including card holder's name, title, telephone number, email and physical address. One problem with physical cards is that information contained often becomes partly or entirely out of date such as when card holder's job title changes, or they relocate to a different address, or move to a different company with a different phone number and email address. Furthermore, the physical card has limitations on the amount of information that can be readily conveyed before the card becomes too busy and perhaps unreadable due to the smaller font sizes. Moreover, the physical cards do not provide the ability for the card holder or the recipient to keep a log of the conversation or interaction or the context under which the card was exchanged. Whenever such an "interaction annotation" is made on the physical card by writing on it for example, the users' writing and the ability to paraphrase will ultimate make any annotations logs comparatively unintelligible.

A conventional physical business cards tend to become voluminous to handle and carry around in large numbers and consequently will get lost or misplaced. With physical card there is also the drawback for the card holder running unexpectedly running out of business cards at a large gathering such as a business convention where it may be difficult and expensive to get additional cards to hand out.

Current solutions for exchanging contact information rely on physical business cards put the burden of managing the contact information on to the recipient of the card information rather than the holder or supplier of this information. In addition, because the current methods save the contact information locally into the recipients' systems, for example, email systems' contact, mobile devices' contact or even rolodex, etc., they suffer from the data duplication problem where the same data is stored in multiple databases which must be synchronized when the contact's information is updated. This creates the issues of "redundancy" where the data is saved in multiple locations leading to potential problems in data normalization and consistency making it hard to determine which of the myriad copies of the data is correct.

These shortcomings of the traditional contact information management systems are overcome by the present invention utilizing an electronic business card wherein the contact information is saved on one centralized server and shared using electronic tokens. The recipient of the contact information creates the connection through accepting an invitation or using a token in the system. The token is typically used to establish the relationship between the supplier and the recipient of the contact.

In the system proposed, the card information is managed only by the owner of the information, i.e. the owner of the electronic business card. All contact information is stored on a contact management server accessible from the wired or wireless Internet. All the clients then access the information on an as-needed basis them from the card management server. Each user accesses the information through her credentials. Once a user logs in, the system automatically brings in the contact list from the server. This contact list is never stored on the local device or chip. With this approach it allows a user to access or manage the contact from anywhere or any device in a consistent manner.

The fundamental problem with the existing card information management is the issue of data ownership. In the systems available today, the ownership of contact information lies with the information recipient. The recipient of a contact information in a business setting will create their own data record on their own local contact management system. The contact information will have to be transformed to fit into the fields that are supported by the recipient's contact management system, regardless of the contact information specifics that may be included in the owner's contact details. For example, it is sometimes difficult, or even impossible, fit in the address information for some foreign countries into the address book or contact management software popularly used in the US. This problem is further exacerbated when custom fields are created in one client-side contact management database do not map consistency with the custom fields created on another synchronized client-side management database on another device. What is needed is a system that lets the owner of the contact information own and further manages the contact information. The owner of the contact information can define the custom fields that make most sense in their specific situation and have this contact information be simply viewed, not copied, on the client-side software used by the recipient of the contact information. The recipient never has to update their version of the contact information since they don't own it, and cannot make changes to it. So when the contact information owner's phone number changes, they go and update the information on the database server, and the new phone number becomes visible to all of the recipients the next time they view the contact's electronic business card. The client side does not need to be constantly kept in sync.

The system disclosed transfers the ownership of the business card to the business contact. The recipient doesn't and in fact shouldn't be creating or editing someone else's data. This then is the philosophical difference between the current invention and the prior art as the contact data about a person is completely created, edited, and controlled only by that person. Recipient of the contact information is given the permission to see that information and perhaps only communicate with a person through the mechanism or connection that the person opens up for communication.

The invention disclosed also offers the benefits of reducing the unnecessary data explosion and redundancy with incorrect data replicated by multiple client side contact management systems. This data management problem grows exponentially in size as number of different types of client devices, number of different types of contact management software applications, the number of people in a person's network of contacts and the number of businesses relying on the contact information continues to grow. What is needed is a system for non-redundant management of contact information that allows the owner of the contact information to create and manage it, as well as control the specific fields that are visible to the recipient.

The vast majority of systems offers today are really a method for synchronization the data amongst multiple devices under one account/user. With this approach duplicated data or links have been created and card information recipients must constantly synch the data to keep it current and updated.

Another class of applications that are emerging rely on scanning the physical business cards using a scanner or a camera device. In these applications, the user scans the physical card they received at a meeting for example. The scanning device then performs an automatic character recognition of the scanned card and saves the information into the business card application software. While this approach does alleviate the problem of manually entering information into a business card application software and its local database, it does not solve the problem of data ownership. The recipient of the card continues to work with multiple copies of the business cards stored on the various devices, and the actual owner of the business card does not own the information and thus cannot keep it updated. It does introduce some additional problems however. The physical business cards usually do not have a standard format; and the great variations in the format of business cards from different countries of origin further exacerbating the problem. Often the names and company information is not correctly interpreted from the scanned image and manual intervention by the user is needed to properly assign the fields into names, phone numbers, and addresses, and sometimes even correct the mistakes introduced by poor recognition rates in certain instances. Frequently the cards with data containing foreign characters or non-typical fonts when scanned and recognized is more error prone and more frequently requires human intervention. And sometimes business professionals are pressed for time and do not properly review the scanned information and live with incorrect or incomplete data.

In summary the existing applications for managing business card data suffer from a variety of problems. These include (1) ownership of personnel data by the data owner where the recipient is burdened with the task of ensuring 'correctness' of the information, i.e. the recorded data is current and updated; (2) the unique font, customized fields and lack of support of fields of the various addresses and phone numbers of a different country by a card management application designed for use specifically for one country; (3) the multiple copies of an address book database maintained on the various devices used by business personnel and the need to maintain consistency across the various copies of the database—which is a different problem from the correctness of information mentioned above; (4) inherent difficulty and error-prone nature of taking a physical business card to its electronic format wherein the information may be transcribed incorrectly with mismatched fields to the data or be entered incorrectly; and (5) the one size fits all dilemma of using the existing business card management application which usually lack the support for handling addresses and idiosyncrasies of contact information from a plurality of countries. Paradoxically, even though the majority of contact profile data owned by the data owner, the recipient creates and maintains her own data like where she meets the owner, contact history, or even things to remember or task, etc. A unified and intelligent management of this information is a need that the existing systems do not fulfill.

SUMMARY OF THE INVENTION

The system disclosed herein comprises of the following three components—a system for managing electronic business cards, a platform for advertising, and a master hub for contacts.

The electronic business card management system manages contact information so that it is managed globally and centrally and entered into the system's database only once and thus normalized. The business card or contact information is saved globally, is then accessible to everyone from anywhere. Since this method and systems requires the data to be saved once only, it prevents contact information from becoming inconsistent through real-time update to eliminate the redundancy or inconsistency. Furthermore, as the data is entered into the system and managed by the owner rather than the recipient of the contact information, the system prevents the contact information from ever becoming stale. And, the system is designed to allow the contact information owner to include custom-fields in their contact information and thus enables the owner to save a full set of the data fields rather than the limited set of fields provided in current business card applications. The system provides access control to the contact information owner by including a mechanism that enables the information owner to control the exposure of specific data fields to specific recipients.

In an embodiment of the system disclosed, a user becomes a member of the system and is identified by the system with their unique system assigned identifier. The user can then create a plurality of groups and can associate herself with those groups, as well as add other members to the group by linking these members through their system assigned unique identifier. A group does not need to be created a-priori. And the user can create his own groups based on the project, work, or friends and family. The groups are created on fly, and the user can then send a specific notification to any selected group(s). The system thus enables the user to have more control over her own groups. The system allows users to be notified using push notifications about any changes to the status, or change in contact information data. Such push notifications are sent to recipients' mobile devices and accessible on the system's centralized server for client machines to pull over the network.

In an embodiment of the invention, the disclosed invention allows tracking notes and contextual details about the owner and the recipient of the electronic business card where contact point data and history is stored. In other words, when the contact link to the server is sent to the recipient, therein lies the ability for the server to store the interaction specific notes. Thus, when the client subscribes to an electronic business card, the server enables the card recipient to make entries in the system's database and thus maintain a log of interaction. These notes are recorded on the card management server and are visible and always visible to the client. An embodiment of the invention also allows the subscribing client to manage reminders whereby the client can request the card management server to push mobile or email reminders pertaining their interaction with electronic card owner.

The primary method for sharing business cards is with the use of a unique token such as a QR-code which the card owner sends to a requestor or a client seeking to use the owner's electronic business card. The recipient of the electronic business card then uses this token to access the contact information over the Internet. The retrieved information is thus the updated information when a record is updated. An embodiment of the invention utilizes dynamic keys or tokens for better data protection. Instead of always using the same fixed key, the disclosed invention in an embodiment can regenerate the token or key. Subsequently, the client recipients who had previously established a connection with the old key will continue to see the contact information. However, anyone trying to establish a new connection with the old key or token will not be able to establish the connection or see the key owner's contact information unless they obtain the new key. Thus the contact owner has the ability to maintain a tighter control on the use of the unique token can do so as to enhance data protection and privacy.

The client using the disclosed card database services do not replicate data into multiple devices and thus eliminates the need of synchronization of data between the devices. The contact data is never stored on the local devices—a single copy (normalized) data is always stored only on the server. Whenever there is a request by the client devices, the contact data is retrieved from the server to the local device. In this manner, data synchronization is never an issue and data consistency and integrity is maintained at all times. However, to improve the performance and reduce the data traffic between the local device and the server, some data like images are automatically compressed on the server.

Contact data is not stored the on the local devices but stored centrally on the server and only when there is a request, data is retrieved from the server to the local devices. Similarly, any context history annotations by the clients and any notes added to the contact as well as reminders are also stored on the central database server and thus retrieved by the client devices whenever needed.

In an embodiment of the invention, the system is used as an advertising platform by allowing a free formation of groups amongst connected customers who can be targeted for advertising or promotional offers. Since the salesperson will have annotation and contextual history of a connected contact readily available the conversion rate for the sale is positively influenced.

An embodiment of the invention serves as a data hub where a master contact data hub is created with relationships between service providers and contacts and provides crucial data that enterprises look for to gain better understanding of their customers. It will eventually have a global contact hub and key for each person in the world so that the data like address could be shared easily between the external systems and people without reentering to each system.

The system disclosed allows users to save full set of the data rather than the limited set of fields saved in current business card applications including all their personal Social Networking Service (SNS) links. The system provides a mechanism to control the exposure of the data fields to the owner of the data so that the data owner has full control over what their contact details are and that they are always updated regularly. The system includes a capability of push notifications whereby a real-time update to electronic business card subscribers will eliminate any inconsistencies created by their locally cached information. The system eliminates redundancy by eliminating the need to enter the same data again and again in several copies of the contact information that the current applications rely on. It also allows the owner of data to enter the data rather than the recipient. The recipient is able to only view the data that the owner allows them to view. Both the owner and the recipient are able to write Notes into the business card page as the owner is able to view all their subscribers and vice versa, so that they can remember important or relevant facts about their relationship as well as the parties set reminders associated with the relationship. The card recipients in a small group further enable a card owner to post any news feed or update to all connected people i.e. members of the group.

BRIEF DESCRIPTION OF THE DRAWINGS

FIG. 10 depicts a logical view of the attributes visibility matrix;

FIG. 11 depicts a Graphical User Interface (GUI) 180 for a Client Desktop App 172 wherein accessibility permissions for each of the attributes defined by the Card Owner 100 are set;

DETAILED DESCRIPTION OF THE INVENTION

The invention disclosed provides the means for saving a business card or contact information globally and once so that people can access the information from anywhere. Because this method and systems allow to save the data only once, it prevents data from being inconsistent.

Figure 1:
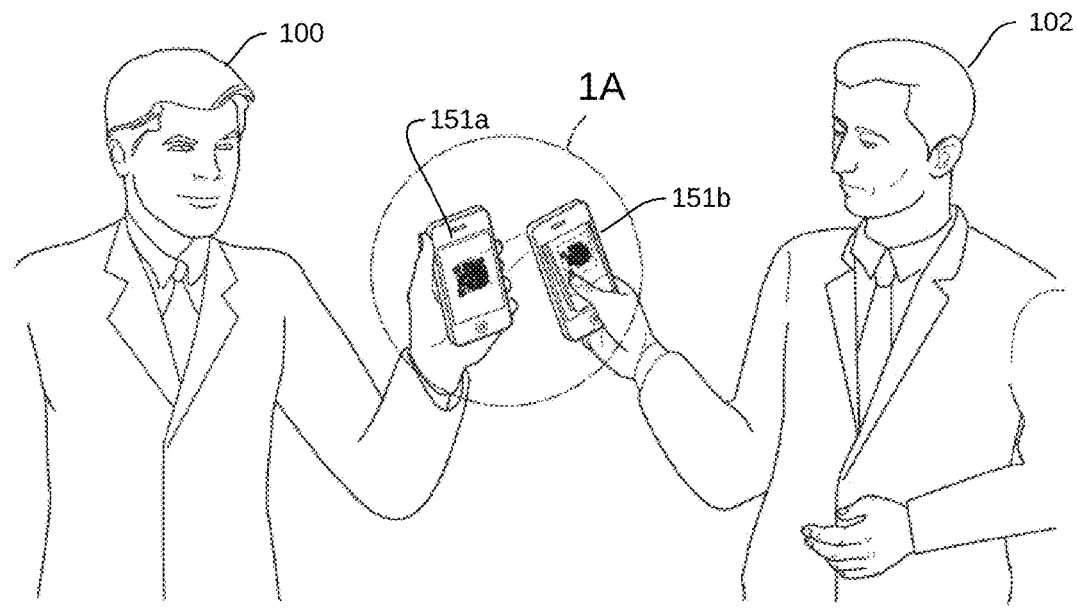
FIG. 1 depicts an environmental view where a Card Owner 100 is delivering their Electronic Business Card 400 to a Card Recipient 102 with FIG. 1A showing the detailed view of the exchange.
Figure 1A:
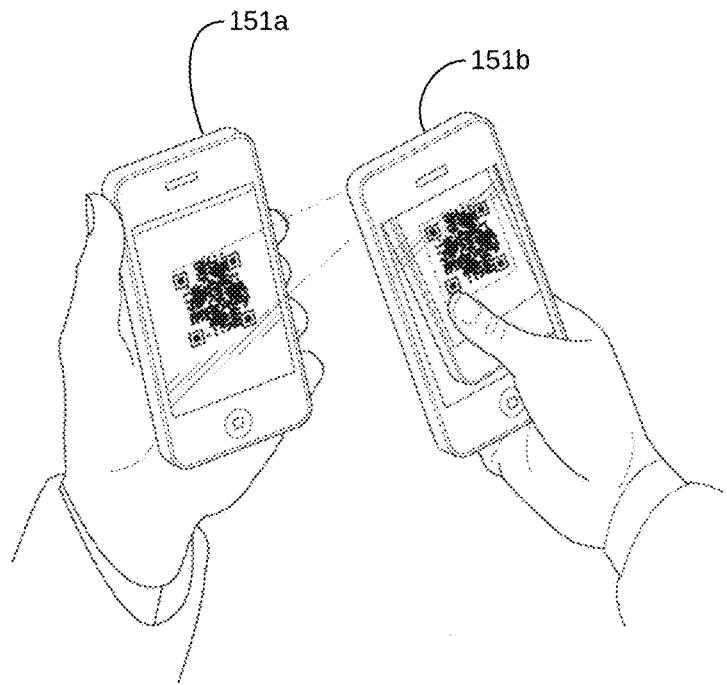

FIG. 1 depicts an environmental view where a Card Owner 100 is delivering their Electronic Business Card 400 to a Card Recipient 102. The illustration depicts an embodiment of the invention where the Card Owner 100 holds the client device, in this instance a mobile phone, while displaying a Business Card Token 405 that encapsulates his Electronic Business Card 400. In the embodiment of the invention shown, an image of the Card Owner 100's Business Card Token 405 is captured by the Client Device 150 of the Card Recipient 102. The software application running on the Client Device 150 of the Card Recipient 102 connects with the Card Management System 500 over a wired or wireless Network 140 and presents its own account information as well as the Business Card Token 405 of Card Owner 100. The card management system validates the Business Card Token 405 token provided by Card Recipient 102, identifies the Card Owner 100 and sets up a link between the Card Owner 100 and the Card Recipient 102. In the link thus established, the Card Recipient 102 is treated as a subscriber to the Card Owner 100. That is, whenever there is a change in the contact information of the Card Owner 100, the subscribers are notified. The subscribers have the ability to disregard these notifications, however if they so choose. However, these notifications can serve the purpose of keeping informed about any changes made to the contact information by someone the subscriber really cares about. It should be noted that the subscription relationship is established in a one-way manner. That is, if the Card Owner 100 now wants to subscribe to the Electronic Business Card 400 of the recipient, the process will need to run in reverse. The Card Recipient 102 will hold up his Business Card Token 405 for the Card Owner 100 and thus allow the subscription relationship to be formed in the reverse direction with the process now proceeding with their owner's and recipient's roles being reversed. Parties exchanging their contact information will now electronically perform the same action as they would when physical cards are involved. Just like the parties exchange their physical business cards, the Business Card Token 405 from the first party is captured by the second party, and then the Business Card Token 405 from the second party is captured by the first. The process of capturing the Business Card Token 405 as defined herein entails the parties Client Device 150 communicating with the Card Management System 500 in this application and establishing a coupling or link between the two parties. This link is used for accessing all the contact information of the Electronic Business Card 400 by the subscribing party. Essentially then, the address book of a subscriber is literally the links that they have subscribed to. When any of the target information changes, the subscriber is informed accordingly.

Business cards are an important mechanism for business people to interact with customers within the context of introducing products, services, or oneself. A physical business card passes the burden of keeping the contact's information listed on the physical card to the recipient of the card rather than the supplier of the card. Even though the business card is usually distributed for the benefit of the supplier of the card. In addition, because the current methods and systems require the storage of the contact information locally onto the recipients' systems, such as the recipient's email system contact, mobile devices' contacts, or even a physical rolodex, etc. This often results in the storage of the contact on multiple places. Furthermore, the recipient does not ever get to know when card owner's contact's information has been updated unless the card owner informs them of the change. This is also problematic for the card owner, who for example may be a salesman who moves to a new company. All except the few he or she personally informs to update the contact information will likely be calling an outdated phone number and in the process creating a missed opportunity for the salesperson.

The mechanism for card distribution in the disclosed Card Management System 500 system is to have the card recipient store a link to the contact information of the Card Owner 100 such that when this contact information is changed no action needs to be taken on either party's part. The card information pointed to by the link will always be current. The address book application running on the Card Recipient 102 client devices stores links to the contact information and retrieves the contact information from the Database 154 over a wired or wireless network only when requested by the Card Recipient 102. Since the contact information belonging to the Card Owner 100 is stored only once, it will be normalized and hence consistent and not subject to data integrity violations and anomalies.

The Card Management System 500 enforces data integrity through an information "ownership" paradigm. The core principle for this form of data integrity is that the information may only be changed by the entity that owns that information. The card owner's information is owned by the Card Owner 100. Thus only the Card Owner 100 shall be allowed to change it. Subscribers to this information such as the Card Recipient 102 thus only have read-only access to the contact information of the Card Owner 100. Using this principle, and principle of normalization—a fundamental concept in data integrity, the disclosed system and methods prevent spurious data from propagating to the multiple clones or copies that the Card Recipient 102 otherwise utilizes. There is never the need, rather there is never a permission granted to the Card Recipient 102 to update any of the Card Owner 100 contact information. Contact information of the Card Owner 100 is owned by the Card Owner 100, and only a single instance of this information is stored on the Database 154 (normalization) and thus completely managed by the Card Management System 500 to which the Card Recipient 102 has access. Thus, it will always be maintained in a current and updated form. The Card Management System 500 essentially saves the business card or contact information globally and once so that people can access the information from anywhere. Because this method and systems allow to globally save data only once, it prevents data from being inconsistent.

The Card Management System 500 also enables the Card Owner 100 to customize information on the business card. Contact information is defined on a set of <Key, Value> pairs, where both these fields are defined by the Card Owner 100. While there are certain Keys such as Name or Email Address which are generally recommended for the Card Owner 100 to provide, there is no requirement that that contact information contain a specific set of keys besides an email address used by the Card Owner 100 for registration. Complete customization of their Electronic Business Card 400 allows the card owners to add fields that best present their contact information with sensitivity to the culture and customs of the locale and settings where the card information is presented. The Card Owner 100 can save a comprehensive, and unlimited set of <Key, Value> pairs for their contact information. Furthermore, this set of <Key, Value> pairs saved for a Card Owner 100 is fixed—the Card Owner 100 can continue to add, edit or delete the <Key, Value> pairs stored with the Electronic Business Card 400. The ability of the Card Owner 100 to create a comprehensive and unlimited set of <Key, Value> pairs is designed to work with the notion of personalities discussed below. The significant notion of customization provided by the Card Management System 500 is that a complete, dynamic and unlimited customization enabling the Card Owner 100 to save a full set of the data is provided, rather than the limited set of fields saved on a physical cards or provided in the current business card software applications.

Another aspect the Card Management System 500 provides its uses as a mechanism for the Card Owner 100 to portray multiple personalities. The Card Owner 100 accomplishes this by associating a subset of the unlimited <Key, Value> pairs with a specific personality while hiding the other <Key, Value> pairs from that personality. In so far as contact information is concerned, a person has somewhat different personalities for work, for family, and for friends. A person may not like to give out his home phone number and address to a customer for example, and similarly his friends will not care about his departmental mail stop or supervisor's extension. A user may also have personalities for his or her foreign colleagues. The Card Owner 100 in using this Card Management System 500 creates a superset of all the <Key, Value> pairs they need including their home phone, home address, departmental mail stop and supervisor's extension, and any foreign addresses or phone numbers they use. Then the Card Owner 100 selectively controls the exposure of a set of the <Key, Value> pairs to a specific Group such as their work group, their family group or their friends group. As illustrated in FIG. 1, the sharing of the Electronic Business Card 400 occurs through the use of tokens where a unique Business Card Token 405 is associated with each Card Owner 100 and each Group they create. When the Card Management System 500 associates a different token with each of these Groups, only the <Key, Value> pairs associated with that Group are visible to the Card Recipient 102 linking with that Business Card Token 405. Thus, only those <Key, Value> pairs of the contact information associated with the Work Group are visible to a linked invoked by a Card Recipient 102 using the Business Card Token 405 for the Work Group (or work personality) of a Card Owner 100. Thus a card owner has multiple personalities—and each personality is encoded in one of the plurality of electronic tokens. When a card owner shares a particular token, only the fields associated with that particular token are visible to the recipient.

Another aspect of the invention is the ability of Card Management System 500 to send push notifications. If any of the fields visible to a particular group or personality changes, the recipient is sent a push notification informing them of the change. The push notification is for information purposes only; the Card Recipient 102 subscriber will always see the updated values for the contact information since access to the contact information is through a link invoked that points to the single normalized and updated copy of the contact information for the Card Owner 100. The Card Management System 500 provides these notifications a manual real-time over-ride for any inconsistent information that the Card Recipient 102 may have cached locally.

As an example of the significance of the push notifications consider a scenario when the Card Recipient 102 relies on rote memorization of information, such as the Card Recipient 102 remembers where a the Card Owner 100's office is located, or what their email address is, or the name of the company they work for. While the Card Recipient 102 will always find the updated information if they access the Card Management System 500, the push notifications help them update any information which they may have cached somewhere else such as their phone's hot-button dial, or GPS of their automobile, or their own human brain. Thus, the Card Management System 500 makes the owner of data responsible for keeping it current, and attempts to flush out outdated and inconsistent information from the locally cached inconsistent copies of the information through push notifications.

Other aspects of Card Management System 500 are the ability for the system to serve as a significant platform for advertising. A salesperson can easily interact with the subscribing and connected customers for targeted advertising or promoting offers for better conversion rate. The Card Management System 500 also serves as a contact master data hub that contains the relationship between service providers and contacts. This is very crucial data that enterprises look for at all times to gain better understanding of their customers.

Figure 2:
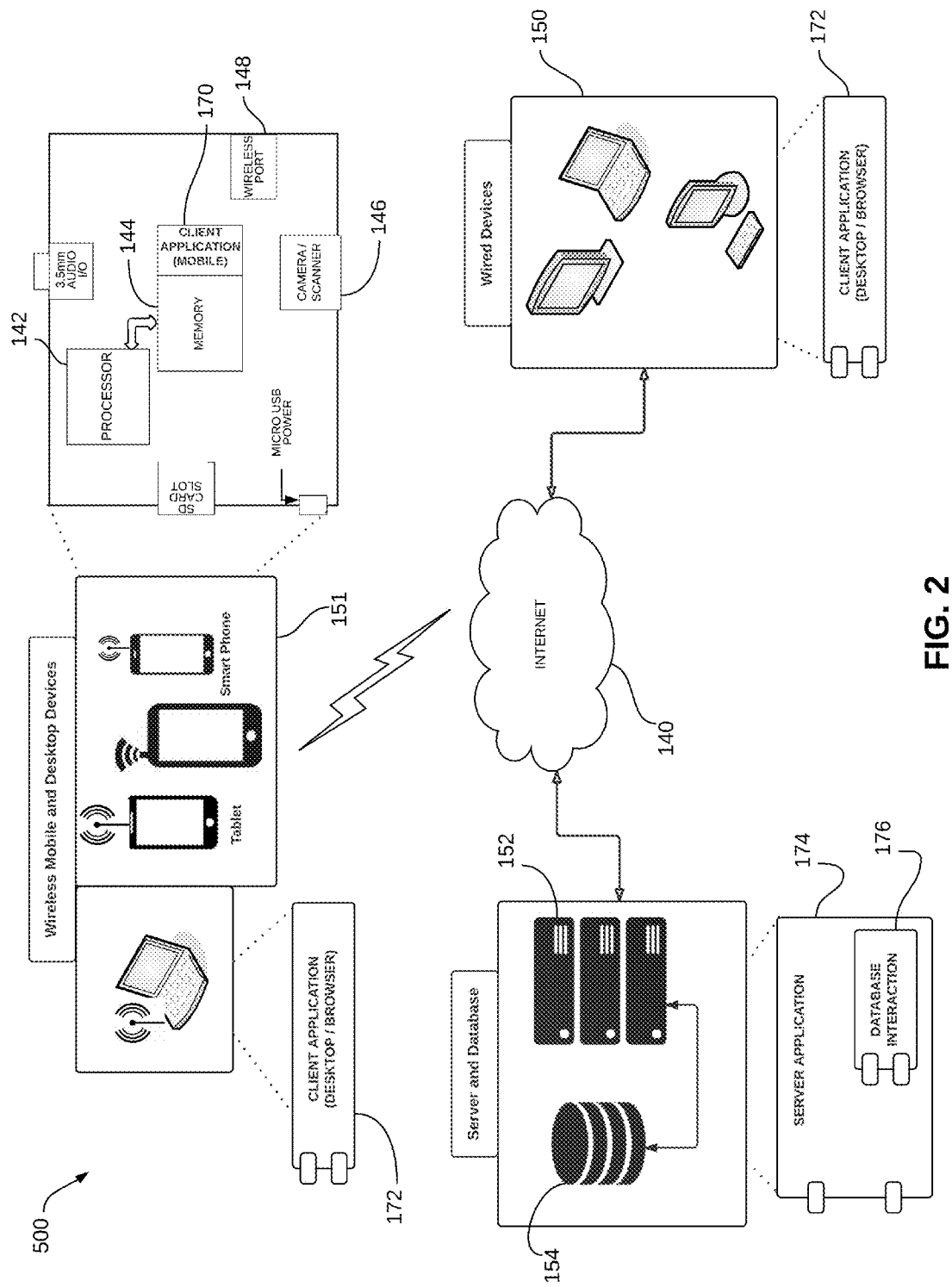
FIG. 2 provides an architectural overview of the Card Management System 500.

FIG. 2 provides an architectural overview of the Card Management System 500. The system uses a Database 154 to store contact information in a plurality of Electronic Business Card 400s where each Electronic Business Card 400 is owned and managed by a Card Owner 100. A Card Owner 100 accesses the Database 154 by connecting to the Server 152. The Server 152 is constantly running the Server Application 174 which is monitoring for connections made by the plurality of users over the Network 140. The Server Application 174 incorporates pieces of code that authenticates a Card Owner 100 or a Card Recipient 102 attempting to access the Database 154. Database integrity, performance and normalization issues are handled by a Server Database Interaction 176 component integrated within the Server Application 174. It is appreciated by a skilled artisan that the performance bottlenecks will be an issue as the number of Electronic Business Card 400s for the users stored in the Database 154 increases. An embodiment of the invention uses a High-Performance Computing Cluster or HPCC for maintaining a high throughput. The HPCC platform incorporates a Server Application 174 built over a commodity computing clusters to provide high-performance, data-parallel using batch data processing and high-performance online query applications using indexed data files. The purpose of batch data processing, also called a data refinery, is used for data cleansing, information extraction and analytics, and creation indexes to support high-performance structured queries. The data refining process is used to support the core functionality of the Server 152 which is a rapid data delivery engine designed as an online high-performance structured query and analysis delivering the high speed data access to online applications through Web services interfaces supporting thousands of simultaneous queries and users with sub-second response times. An embodiment of the invention uses an alternative form of high performance architecture for the S including those based on Shared Memory, Shared Disk or Shared Nothing paradigm.

The Server 152 is accessible to a plurality of client devices over the Network 140 which in an embodiment of the invention included the Wired and Wireless Internet accessibility as illustrated in FIG. 2. Users of the Card Management System 500 access the Server 152 over the Network 140 including Wired or Wireless Internet. Client applications are developed for a plurality of platforms, including mobile, desktop or portable devices. Desktop or portable devices such as laptops are generally referred to as a Client Device 150. It typically runs a fully functioning web or internet browsing application and network connectivity to the server. Client Desktop App 172 is designed on run on Client Device 150 and provide users with the functionality of editing their own Electronic Business Card 400 or linking (subscribing) to the Electronic Business Card 400 of another user of Card Management System 500.

Referring again to FIG. 2, a Client Desktop App 172 running on a Mobile Device 151 such as a smartphone or a tablet is referred to as a Client Mobile App 170. Client Mobile App 170 is designed on run on a mobile operating system. A Client Mobile App 170 is resident on the Memory 144 of the Mobile Device 151 and relies on the availability of a Wireless Port 148 and Processor 142 within the Mobile Device 151 where the Processor 142 is needed to execute the Client Mobile App 170 and the Wireless Port 148 is needed to communicate with the Server 152 over the Network 140 or a Cellular Network 141. Additionally, a Mobile Device 151 is required to incorporate a Camera 146 with sufficient resolution to scan and analyze the Business Card Token 405 image (such as a QR or a Bar Code) used by the Card Recipient 102 to link and subscribe to a Card Owner 100. It will also be appreciated by one skilled in the art that a Client Device 150 can also incorporate capability to communicate over the Cellular Network 141 and may incorporate functionality to scan and analyze a Business Card Token 405 used for subscribing to the Electronic Business Card 400 of a Card Owner 100.

Figure 3:
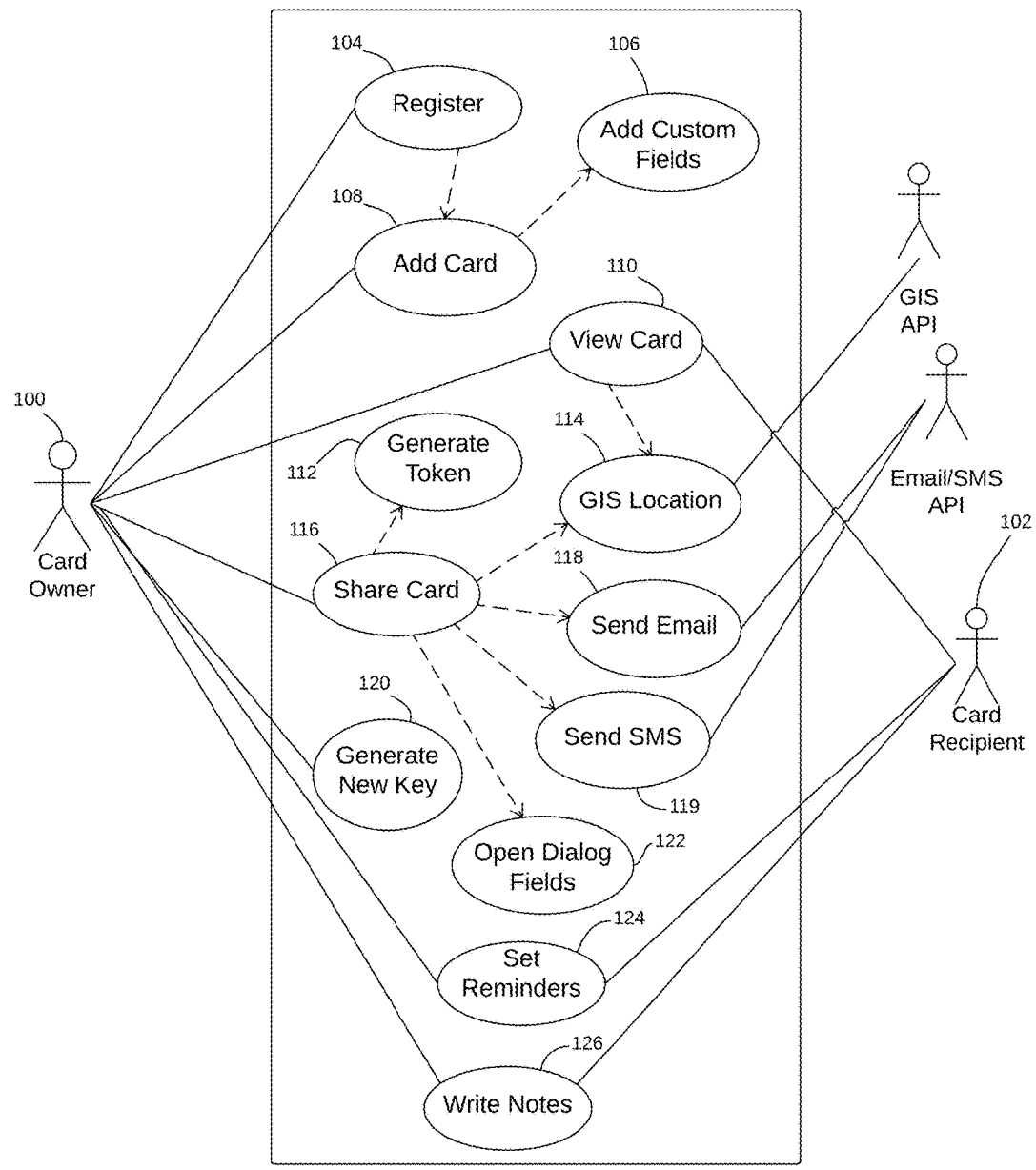
FIG. 3 illustrates a list of use cases capturing the interactions between a Card Owner 100 and a Card Management System 500 for creating, customizing, editing, storing, and sharing electronic business cards.

FIG. 3 illustrates a list of use cases capturing the interactions between a Card Owner 100 and a Card Management System 500 for creating, customizing, editing, storing, and sharing electronic business cards. A Card Owner 100 can Register 104 with the system and Add Card 108 (i.e. create an Electronic Business Card 400) wherein the card would include a plurality of predefined fields. The Card Owner 100 can also Add Custom Fields 106 to their Electronic Business Card 400. A card stored in the system may be viewed using View Card 110 functionality by the Card Owner 100 or the Card Recipient 102. The Card Owner 100 can Share Card 116 the Electronic Business Card 400 by generating a key, such as by use case Generate Token 112 (such as a QR-Code) and send the key using the functionality of Send Email 118 and Send SMS 119 use cases. While sharing the card, the Card Owner 100 may also include GIS Location 114 for the Card Owner 100 when location sharing was enabled. This facilitates in capturing the context when the card owner shared the information such as when the Card Owner 100 met someone at a business meeting and sent a sharing link to Card Recipient 102 providing the Card Recipient 102 with extra cues to let them know where the meeting occurred when Card Owner 100 shared their Electronic Business Card 400. Additionally, the Card Owner 100 can Open Dialog Fields 122 for interaction with the Card Recipient 102. Both Card Owner 100 and Card Recipient 102 can Write Notes 126 and make use of the system as a facility to capture context of the meetings and interactions as well as Set Reminders 124 related to scheduling a planned interaction. To enhance security, the Card Owner 100 can also Generate New Key 120. This makes their older key (such as a QR-Code) non-functional. However, any existing linkages, i.e. subscriptions to their Electronic Business Card 400, are not automatically removed. Once the Card Owner 100 does generate a new key their old key becomes defunct and may not be used by potential subscribers to link with Card Owner 100.

An embodiment of the invention discloses a computer-implemented method for editing an electronic business card, the method comprising: receiving, by a user computer device, a transaction request including instructions from a user to edit the electronic business card wherein the instructions include a user account number, edit-commands, and a plurality of editing-data items; communicating, by the user computer device, the transaction request to a card management system wherein the card management system includes a computing server, a memory, and a database comprising of a plurality of electronic business cards each having an associated account number and a plurality of contact information items; determining, by the computing server, whether the account number in the transaction request equals a matching database account number where the matching database account number is an account number of one of the plurality of the electronic business cards stored in the database; rejecting, by the computing server, the transaction request when computing server does not find the matching database account number; accepting, by the computing server, transaction request when computing server finds the matching database account number, whereupon computing server performs the additional steps comprising—retrieving, from the database into memory, a contact record of the electronic business card for the matching database account number, applying, to the contact record in memory, the edit-commands and the plurality of editing data items included the transaction request, and saving, from memory to the database, the contact record; creating, by the computing server, a status code having a first value when rejecting the transaction request, and having a second value when accepting the transaction request; and communicating a response code to the user computer device.

Further, an embodiment of the invention discloses a computer-implemented method for editing an electronic business card wherein the edit-commands are directed towards creating a plurality of contact information items; and upon accepting the transaction request, the computing server further performing the steps comprising of—creating, in the memory, a contact record having an associated account number; setting, in the memory, the associated account number equal to the user account number; parsing, in the memory, the plurality of editing-data items to yield a plurality of contact information items; assigning, in the memory, the plurality of contact information items to the contact record; and saving, from the memory to the database, the contact record.

By the way of an example, the instructions with the edit command in an embodiment of the invention for creating record of John Smith with user account number of 100, and phone number of 234-567-8901 are:

<100, <Create>, <<Name="John Smith"><Phone="234-567-8901">>> wherein the edit-command is Create and the plurality of editing-data items are:

<<Name="John Smith"><Phone="234-567-8901">>

Figure 4:
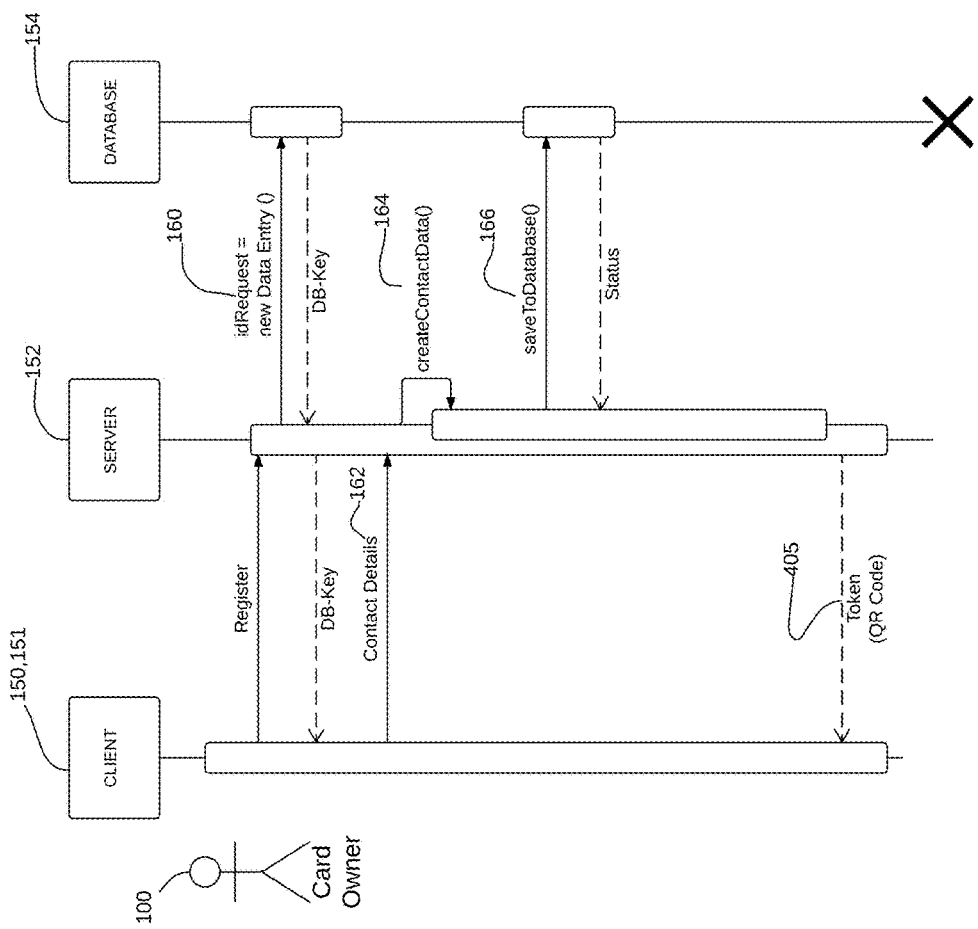
FIG. 4 is a software sequence diagram depicting the interaction between a Client Device 150 and a Server 152 computer whereby an Electronic Business Card 400 is created and stored in a Database 154 managed by the Server 152 computer.

FIG. 4 illustrates the interaction between various software objects of the invention using a UML (Unified Modeling Language) Sequence Diagram. The Client Device 150 or Mobile Device 151 is used by the card owner to create a data record, by interacting with the Server 152 which in turn utilizes the services of a Database 154. The process begins by the Card Owner 100 sending a request to register with the Server 152. Upon receiving the registration request for a specified user with valid credentials, the Server 152 invokes procedure a New Data Entry 160, resulting in the creation of new record in the Database 154. The Server 152 receives a handle to the newly created business card record. The Server 152 then returns this handle to the Client Desktop App 172 or the Client Mobile App 170 which in turn prompts the Card Owner 100 to provide their Contact Details 162. These are captured in the locale and the regional format customized to the preferences of the Card Owner 100. The Contact Details 162 are communicated to the Server 152 that parses this information and invokes a procedure Create Contact Data Object 164 to populate the database corresponding to the handle of the newly created database record. These procedures are carried out in an atomic transaction, and when all of the data is available to the Server 152, the object is saved to the Database 154 using the procedure saveToDatabase( ) to Save Record to Database 166 which saves the populated data object including any additional customized fields defined in the Contact Details 162. The saved contact details into the database is an Electronic Business Card 400 for the Card Owner 100. The status of this action is provided back to the Server 152. Upon the successful creation of an Electronic Business Card 400, in the Card Management System 500 generates a Business Card Token 405 corresponding to the business card, which serves as an alternate key for the Electronic Business Card 400. The Server 152 sends this Business Card Token 405 back to the Client Device 150. In an embodiment of the invention, the Business Card Token 405 is a bar code or a QR-Code or a alphanumeric string such that there is a one to one mapping between the Business Card Token 405 and the Electronic Business Card 400.

In an embodiment of the invention, the Business Card Token 405 is a QR-Code or Quick Response Code which is type of machine readable matrix barcode (or two-dimensional barcode) optical labels used for efficiently storage of data. A QR code consists of black modules (square dots) arranged in a square grid on a white background that can be read by an imaging device, such as a camera or a scanner, and processed using Reed-Solomon error correction until the image can be appropriately interpreted. The required data is then extracted from patterns that are present in both horizontal and vertical components of the image. Typically, a smartphone is used as a QR code scanner. The smartphone can read a QR code and display information about the contact. In an embodiment of the invention the QR code encodes a Uniform Resource Identifier (URI) for the business card of a Card Owner 100. A Card Recipient 102, using their Client Mobile App 170 running on their Mobile Device 151 can use the QR Code image being perceived by the smartphone camera to contact the Server 152 and retrieve the corresponding Electronic Business Card 400 display the contact details stored therein. In an embodiment of the invention the URI encoded in the QR code is a standard URL used for accessing a website where the contact information is viewable in a web browser.

In an embodiment of the invention, the Business Card Token 405 is a Bar-Code is an optical machine-readable representation of data represented data by varying the widths and spacing of parallel lines. Bar-Codes originally were scanned by special optical scanners called barcode readers. Software has became available for devices such as smartphones with cameras that can also scan and interpret Bar-Codes.

Referring next to the format of storing contact details in a flexible and powerful format, an embodiment of the invention encodes contact details as <Attribute, Value> pairs. This format is known as a name-value pair, key-value pair, or field-value pair and is adaptable for storage on a database using the Extensible Markup Language of XML schemas. The attribute-value pair is a fundamental data representation used for defining open-ended data structure that enable extending the data structure without modifying existing code or data. Without limitation to the specific format of any one data model, an embodiment of the invention uses a data model for capturing the business card information by utilizing a collection of <Attribute, Value> tuples wherein each of the Attribute is chosen by the Card Owner 100 depending on the particular preferences, application and the locale. Core sets of Attributes are chosen by programmers. In an embodiment of the invention, the programmer defined Attributes include Name, Phone, E-Mail, and Address. However, the Card Owner 100 may choose to use these Attributes or define all the attributes themselves, use some of the programmer defined Attributes and define additional Attributes of their own.

Figure 5:
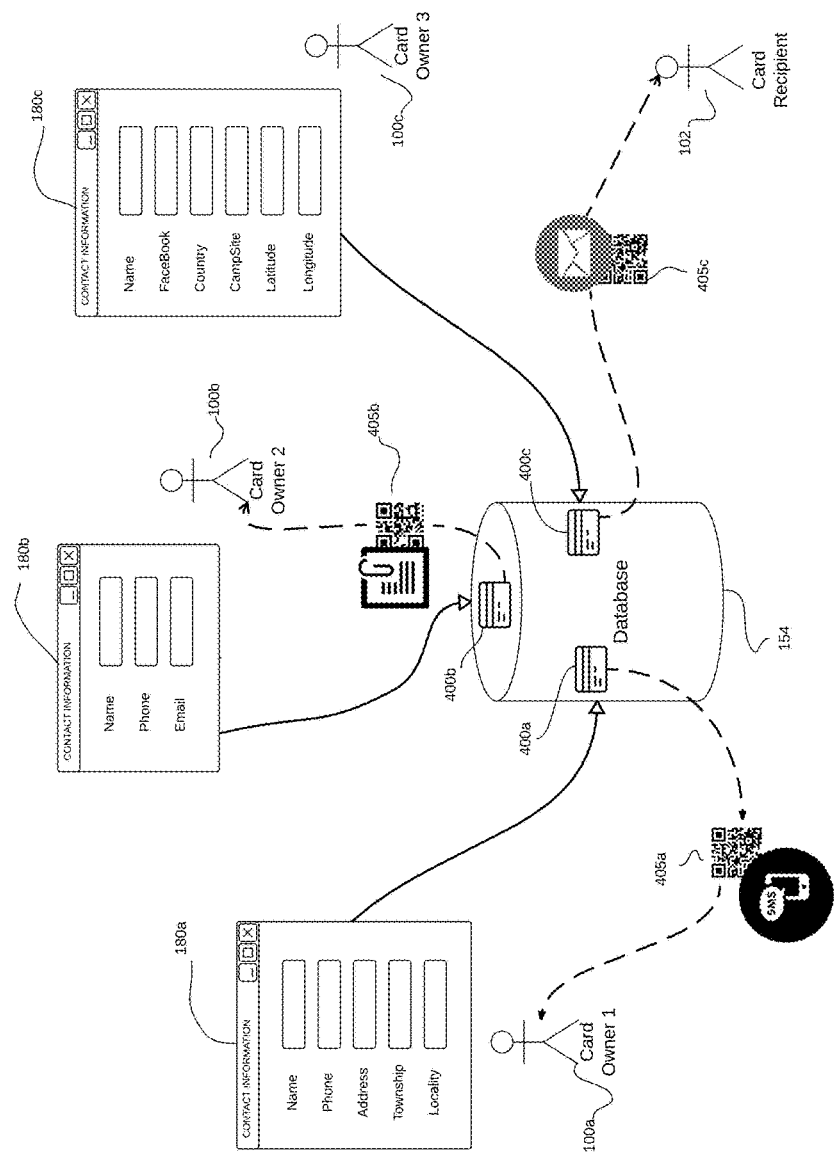
FIG. 5 illustrates a Graphical User Interface (GUI) 180 schematic whereby a Card Owner 100 can define a specific and custom set of fields or attributes used for creating their Electronic Business Card 400.

FIG. 5 illustrates a graphical user schematic whereby the user can define the specific and custom fields used for creating their Electronic Business Card 400. In this illustration Card Owner 100a is using Graphical User Interface (GUI) 180a, Card Owner 100b is using the Graphical User Interface (GUI) 180b, and Card Owner 100c is using Graphical User Interface (GUI) 180c to respectively create their electronic business cards Electronic Business Card 400a, Electronic Business Card 400b, and Electronic Business Card 400c. All the instances of client applications are interacting with the Database 154 through the Server 152 where the electronic business cards for each of the card users are saved. The functionality illustrated is the system's ability to allow customized fields for a card owner's contact information.

As illustrated in the embodiment of the invention, the Graphical User Interface (GUI) 180a in FIG. 5 uses the name, phone number, address, township, and uses an additional custom field called locality for capturing information or specific guidance to the card recipients where the card owner provides some directional guidance such as 'the store entrance located on the south side of the garden,' or 'it's the red brick house by the oak tree,' or something similar. Other than that this Electronic Business Card 400a uses fields that fairly typical set of fields used in capturing contact information. Upon entry of the information into the Database 154, the Card Management System 500 creates Business Card Token 405a. In this instance the Card Owner 100a has the Card Management System 500 send the Business Card Token 405a to themselves using a Short Text Message (SMS).

As illustrated in the embodiment of the invention, a Card Owner 100b in FIG. 5, the card owner—primarily using the Card Management System 500 for business use—has chosen to provide very basic information about themselves. This could be because they are in transition, between jobs, laid off, or traveling and thus do not have an address they want to distribute to their business contacts. This illustrates the ability to dynamically provide an updated information to the card recipient which automatically shows up when they view a card owner's data. Upon entry of the information into the Graphical User Interface (GUI) 180b, the Card Management System 500 creates an Electronic Business Card 400b and saves it in Database 154. The Card Owner 100b may choose to have the corresponding Business Card Token 405b messaged or emailed to themselves or someone else. Additionally, as illustrated, Card Owner 100b can download the Business Card Token 405b to a file and save it to their device for use at later time and distribute as needed.

Further referring to the embodiment of the invention in FIG. 5, the Card Owner 100c is a hiker and providing information about their contact information using links to their Facebook Address, Campsite information, and their Latitude and Longitude information. Thus Card Owner 100c is able to direct their card recipients to visit their Facebook or other social media page to further look up information about their campsite, for example. The card owner can now provide an updated information about their specific address customized fields such as latitude and longitude. Upon entry of the information into the Database 154, the Card Management System 500 creates or updates their Electronic Business Card 400c. The Card Owner 100c has the Card Management System 500 send their Business Card Token 405c to a Card Recipient 102 as an electronic mail message.

In an embodiment of the invention where the edit-command is directed towards creating an electronic business card, the parsing of the plurality of editing-data items yields a plurality of <Attribute, Value> pairs that define a plurality of contact information items by assigning the plurality of <Attribute, Value> pairs to the contact record therein. Thus, the attributes supports creating customization of fields, as an example two different set of attributes to define their contact records using <Attribute, Value> format where the attributes in the first record are Name and Phone, and those in the second record are El Nombre and Casa, respectively for user account numbers 100 and 101:

<100, <Create>, <<Name="John Smith"><Phone="234-567-8901">>>

<101, <Create>, <<El Nombre="Jill Sanchez"><Casa="+52-1234-567-89">>>

An embodiment of the invention uses edit-commands request for creating electronic business card token and upon accepting the transaction request and retrieving the contact record into memory, the computing server further performing the steps comprising of—generating, using data from the contact record in memory, a code wherein the code is a QR-Code, a Bar-Code, or an Alphanumeric-Code; augmenting, the contact record in memory, with the code; and saving, into the database, the augmented contact record.

Figure 6:
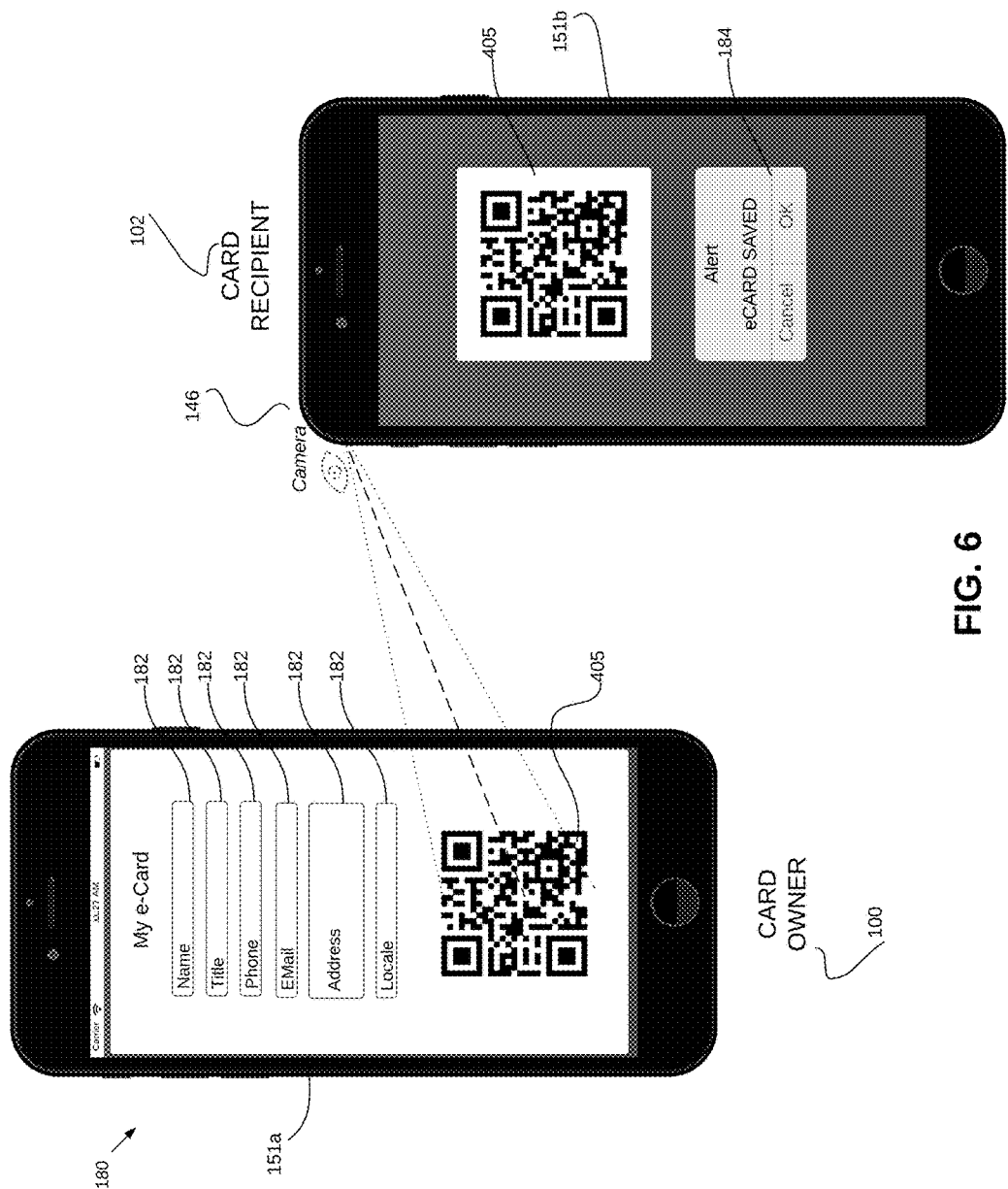
FIG. 6 depicts the use of the camera in a Client Device 150 of a Card Recipient 102 taking a picture of the token on a Client Device 150 of a Card Owner 100 and thereby establishing a subscription to their Electronic Business Card 400.

FIG. 6 illustrates a detailed environmental view of the card delivery process using mobile phones with the use of a camera and the card management software running on mobile devices. The device Mobile Device 151a belonging to the Card Owner 100 is shown running a Client Mobile App 170 and displaying its Graphical User Interface (GUI) 180. In an embodiment of the invention, the Graphical User Interface (GUI) 180 display includes a plurality of GUI Text Element 182 that comprise the contact information along with a display of Business Card Token 405. The Card Recipient 102 has the Client Mobile App 170 running on its Mobile Device 151b and uses the Camera 146 on their device to take a picture of Business Card Token 405 displayed on the device belonging to Card Owner 100. The Client Mobile App 170 running on Card Recipient 102's device then connects with the Server 152 of the Card Management System 500 and delivers the Business Card Token 405 along with the identifying information about Card Recipient 102 over the Network 140. The Server 152 performs the necessary authentication and uses the Business Card Token 405 to verify and determine the database identifier for Card Owner 100. Upon a successful completion of the authentication and verification steps, the Server 152 creates and saves in Database 154 a link between Card Owner 100 and Card Recipient 102. Specifically, the link designates Card Recipient 102 as a subscriber to the Electronic Business Card 400 of the Card Owner 100. The Mobile Device 151b next displays a GUI Alert 184 on the device belonging to the Card Recipient 102 to informing them of the update to their address book. The address book of Card Recipient 102 now displays the contact information for Card Owner 100. In an embodiment of the invention the address book of the native Client Device 150 is extended so that the contact information of Card Owner 100 is integrated therein through a network link to the Database 154 using a Uniform Resource Identifier or URI on the Network 140.

Figure 7:
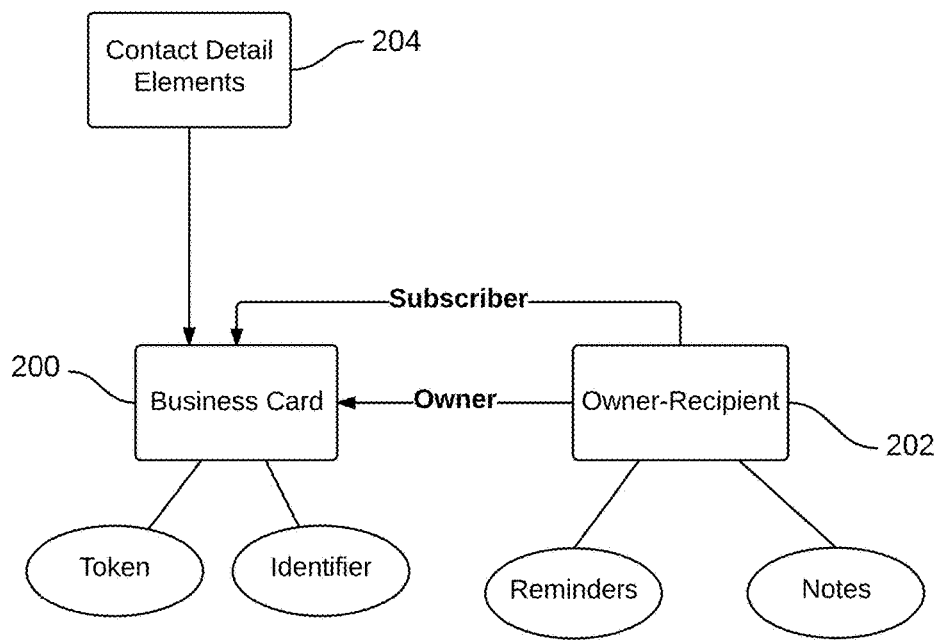
FIG. 7 depicts an Entity Relationship Diagram for implementing a database where Card Owner 100 and Card Recipient 102 are linked using a recursive M:N (many-to-many) database relationship.

As illustrated in the Entity Relationship diagram in FIG. 7, the Card Owner 100 and the Card Recipient 102 are instances of the same entity class namely Business Card Entity 200. Plurality of entity instances of this class are stored in Database 154 with all entity instances stored within the same relation in an embodiment of the invention that uses a relational database for implementation. Thus, a card owner and a card recipient are both registered users and use Card Management System 500 for managing their business cards. Each instance of Business Card Entity 200 has many Contact Details 204 associated with it thereby allowing a flexibility to customize and store as many details about the contact information as the card owner user desired. The Owner-Recipient Entity 202 is a relationship entity and specifically a many-to-many recursive relationship entity. Thus for example, a card-owner can have many subscribers or recipients, as well as a recipient may have subscribed to many card-owners. Here, the designation of a card-owner is determined by the ability to edit the contact information. Since both the card-owner and card-recipient are instances of the same class and stored in the same table, the designation of an entity instance as a card-owner or a card-recipient is determined only by the transaction that led to the creation of the link between the two entity instances, i.e. resulted in the creation of a relationship instance in the Owner-Recipient Entity 202. Within the Entity Relationship Diagram illustrated in FIG. 7, that respective role between two instances of Business Card Entity 200 is provided within the intersection table Owner-Recipient Entity 202. This table creates the linkages between the two entity instances in the Business Card Entity 200 table. Further, it is a recursive relationship since it is formed between instances of the same entity class.

Figure 8:
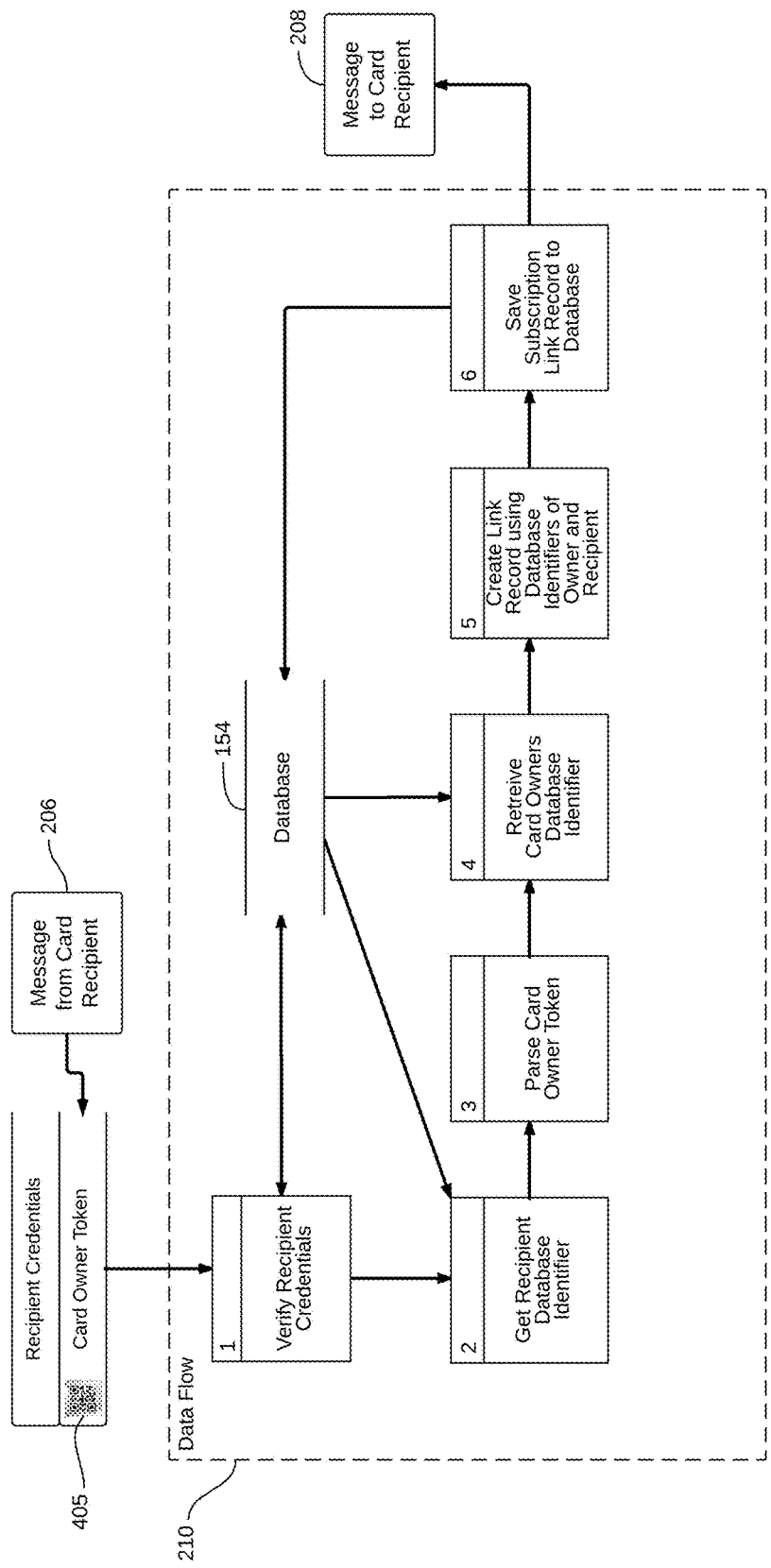
FIG. 8 depicts a Functional Process Diagram showing the server side processing for establishing a subscription of the Electronic Business Card 400 by a Card Recipient 102.

Referring next to FIG. 8, a Functional Process Diagram showing the server side processing for creating a subscription is depicted. The subscription process is initiated by Card Recipient 102 by sending a Subscription Request Message 206 to Server 152 wherein the message containing the authenticating credentials for the Card Recipient 102 as well as the Business Card Token 405 for the Card Owner 100. The processing steps are encapsulated within the Subscription Processing 210 which is executed by computing engine of the Server 152, with the specific labeling of the processing steps provided in FIG. 8. Step 1 concerns the authentication process whereby the credentials of the Card Recipient 102 are verified. Step 2 next entails looking up the key, or the database identifier, for Card Recipient 102 which uniquely identifies their database record. Following Step 3 parses the Subscription Request Message 206 to extract out the Business Card Token 405 for Card Owner 100. Step 4 next entails looking up and retrieving the key, or the identifier, used to uniquely identify the Card Owner 100 within the Database 154. The key for Card Owner 100 is the parent (i.e. Owner role in FIG. 7) and the key for Card Recipient 102 is the child (i.e. Subscriber role in FIG. 7) in a subscription relationship. This relationship instance, a record containing the database identifiers or keys for the Card Owner 100 and Card Recipient 102 is next created in Step 5. The following step, Step 6, saves this linkage, or the relationship instance in the Database 154, specifically within the table or the store corresponding to relationship entity, i.e. Owner-Recipient Entity 202 as shown in FIG. 7. Upon successful completion of saving the linkage data, and thus completion of the subscription process, the Card Recipient 102 is notified by a message Subscription Confirmation Message 208. In an embodiment of the invention, the Subscription Confirmation Message 208 notification is also sent to the Card Owner 100.

Figure 9:
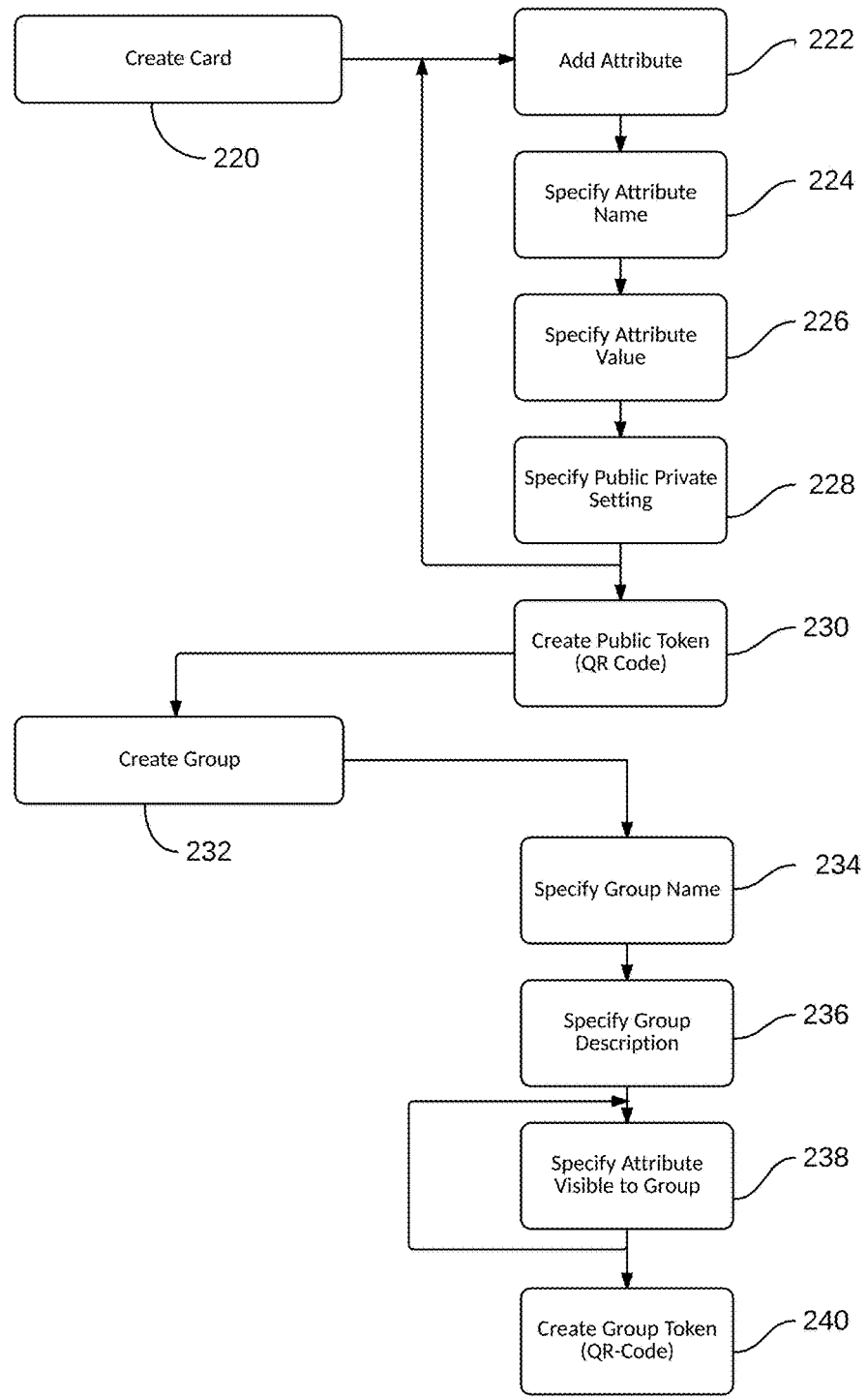
FIG. 9 depicts the data flow diagram illustrating the ability of a Card Owner 100 to create a set of attributes, create a group, and control the ability of group members to view the attributes.

Subscription Groups:

Referring next to FIG. 9, a data flow diagram illustrates an embodiment of the invention where the contact information is stored in elements and how these elements are visible to designated Groups. Further illustrated in the data flow diagram is the ability for a card owner to create groups and assign visibility of each individual element to the members of that group. The Card Owner 100 executes a function provided by the Card Management System 500 to Create Card 220. This results in the creation of an empty Electronic Business Card 400. This card is saved in the Database 154.

As illustrated in FIG. 9, the Card Owner 100 then executes functions for adding a plurality of attributes to the Electronic Business Card 400. These attributes are designed to capture their contact information. For each of the attributes added to their Electronic Business Card 400, the Card Owner 100 executes a function to Add Attribute 222, specifies Attribute Type 224 and Attribute Value 226, and further specifies a Public Permission 228 for that attribute. If granted, this public permission enables the attributes to be visible to everyone regardless of whether they belong to any particular group or not. Thus, the public information will be visible to anyone querying the Card Management System 500 about a card owner. It will therefore be appreciated that the Card Owner 100 picks some generic attributes, or the information they want to share with everyone, to be their public attributes. Correspondingly, the Card Management System 500 creates a Public Token 230, which is an instance of Business Card Token 405, for the Card Owner 100. The Public Token 230 links back to the contact information for the Card Owner 100 but only displays the information for those attributes where Public Permission 228 is granted.

Next, FIG. 9 further illustrates the ability for Card Owner 100 to define groups where additional attributes (that do not have a public permission) are granted permission on a group-by-group basis. The Card Management System 500 allows a Card Owner 100 to Create Group 232, provide a Group Name 234 and a Group Description 236, and then add Attribute Group Permission 238 to any of the non-public attributes previously defined. Upon doing so, the specific attributes chosen become visible to the group. Note that only the permissions for non-public attributes need to be considered since the public attributes are visible to everyone including members of any group. When all the attributes have been thus added, the Card Owner 100 generates a Group Token 240 which is an instance of the Business Card Token 405 but separate and distinct token from Public Token 230. When a Card Recipient 102 subscribes to a Card Owner 100 using their Group Token 240, they can cumulatively view the card owner's contact information permitted for the public as well as the information permitted for that group. In this manner, a Card Owner 100 can have the Card Management System 500 generate a plurality of Business Card Token 405—one for sharing with the everyone (Public Token 230) and then one each (Group Token 240) for sharing with the members of their defined groups.

FIG. 10 is a logical view of the attributes visibility. The illustration shows $Attribute_1$ and $Attribute_2$ to be public attributes. This implies that the values that the card owner stores for these attributes are visible to subscribers in all groups, and even those members who do not belong to any group. Anyone visiting a web interface of the Card Management System 500 is able to search for business card information using public attributes. Generally, all card owners will keep their names and general email as publicly accessible attributes. Thus a potential subscriber will be able to request the Business Card Token 405 for a specific card owner using their publicly disclosed information such as their email.

Referring to FIG. 10, some attributes such as $Attribute_2$ is accessible only to $Group_1$. Thus only those subscribers belonging to $Group_1$ are able to view the values that a Card Owner 100 stores for $Attribute_2$. Similarly, only those subscribers belonging to $Group_2$ are able to view the values that Card Owner 100 stores for $Attribute_3$. Similarly, group accessibility for all non-public attributes is defined by Card Owner 100. The membership in a particular Group is controlled by the Card Owner 100 by supplying the Card Recipient 102 with a Group Token 240 which is a specific instance of Business Card Token 405.

FIG. 11 depicts a Graphical User Interface (GUI) 180 for a Client Desktop App 172 wherein accessibility permissions for each of the attributes defined by the Card Owner 100 are set. In the illustration shown, the Card Owner 100 has defined three groups named Work, Family and Friends. The Card Owner 100 uses the pull-down control widget of the Graphical User Interface (GUI) 180 to select the Work group. Attribute permissions for subscribers a group called "Work" are then specified by the Card Owner 100 to select the contact information that the Card Owner 100 wishes to make accessible to his or her co-workers. It should be noted that the first two attributes—name and email address—are public and so the interface prevents the user from defining any group permissions for these attributes. Permission values for the "Work" group are set of all the remaining attributes defined by the Card Owner 100. The Card Owner 100 sends the Business Card Token 405 corresponding to the Work group to their co-workers who can then link to the card owner's Electronic Business Card 400.

Figure 12:
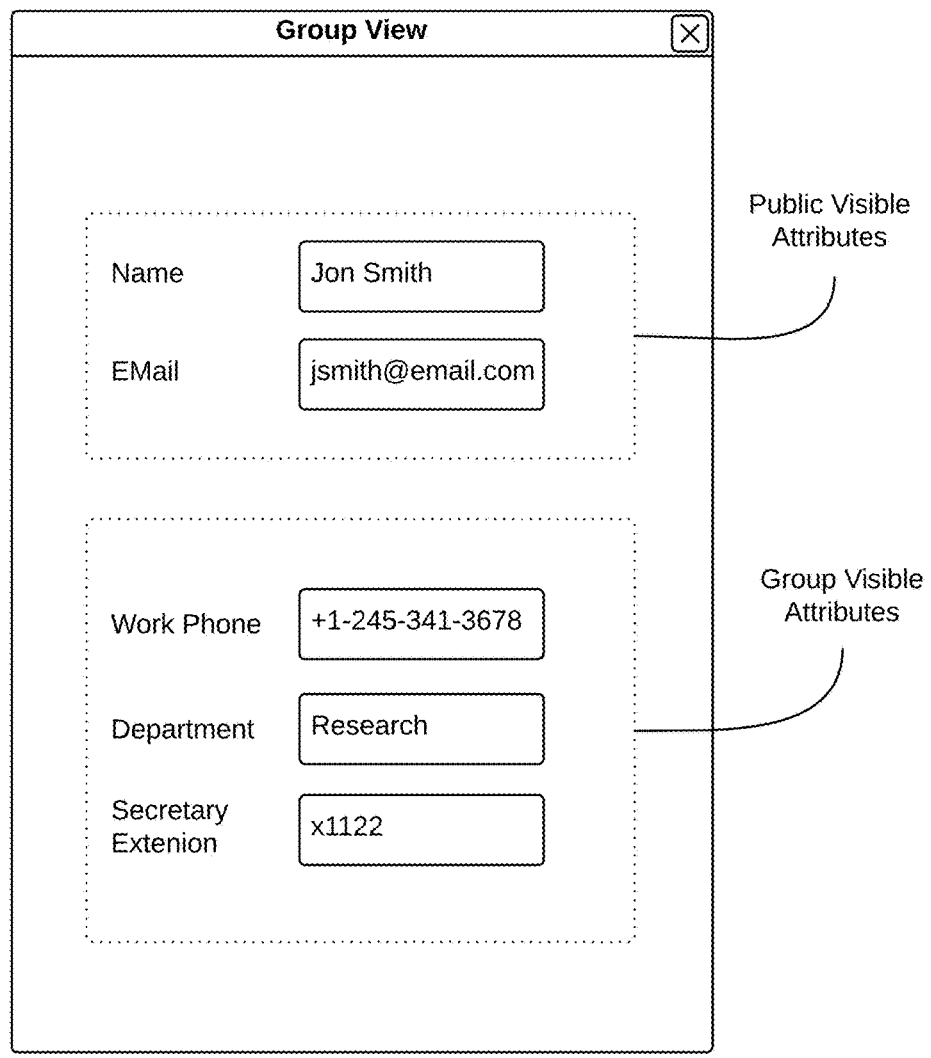
FIG. 12 depicts the group view of an Electronic Business Card 400.

Upon linking to the Electronic Business Card 400 of a card owner, the members of the group observe a view of the Electronic Business Card 400 illustrated in FIG. 12. This is a Union of the attributes accessible to the Public and those accessible to the particular Group to which the subscriber belongs. It should be noted that the access to the information on a Electronic Business Card 400 is stored on the Database 154. As a result, the Card Owner 100 can dynamically change the permissions granted for any of the attributes to any group. When that happens the Electronic Business Card 400 blocks the groups' viewing ability for that specific attribute. This functionality becomes possible dynamically since all the information on a business cards comes from a centralized Database 154 allowing for an easy modifications to the permissions.

An embodiment of the invention uses a computer-implemented method for retrieving an electronic business card, the method comprising: receiving, by a user computer device, a request to retrieve an electronic business card wherein the request includes a token used for identifying the electronic business card; communicating, by the user computer device, the request to a card management system wherein the card management system includes a computing server, a memory, and a database comprising of a plurality of electronic business cards each having an associated account number, a card-token, and a plurality of contact information items; matching, by the computing server, the token in request to each of the card-token for the plurality of the electronic business cards stored in the database; rejecting, by the computing server, the request when computing server does not find a matching database card-token; accepting, by the computing server, the request when computing server finds the matching database card-token, whereupon computing server performing the steps comprising—retrieving, from the database into memory, the plurality of contact information items for the electronic business card for the matching database card-token, and communicating, from the memory to the user computer device, the plurality of contact information items; creating, by the computing server, a status code having a first value when rejecting the retrieve request, and having a second value when accepting the retrieve request; and communicating, by the computing server, the response code to the user computer device.

An embodiment of the invention uses a computer-implemented method for retrieving an electronic business card wherein the token used for identifying an electronic business card is a QR-Code, a Bar-Code, or an Alphanumeric-Code. An embodiment of the invention uses a computer-implemented method for retrieving an electronic business card the token used for identifying an electronic business card comprises of the database account number of the electronic business card. An embodiment of the invention uses a computer-implemented method for retrieving an electronic business card wherein the user computer device is a web browser.

An embodiment of the invention uses a computer-implemented method for retrieving an electronic business card wherein each of the plurality of each of the plurality of contact information items of the electronic business has an associated attribute determining the user's permission to the contact information item, the method further comprising—classifying, by the computing server, each of the plurality of contact information items into a first class if the user has access to the contact information item, otherwise classifying the contact information item into a second class; communicating, by the computing server, the plurality of contact information items the first class to the user computer device.

Figure 13:
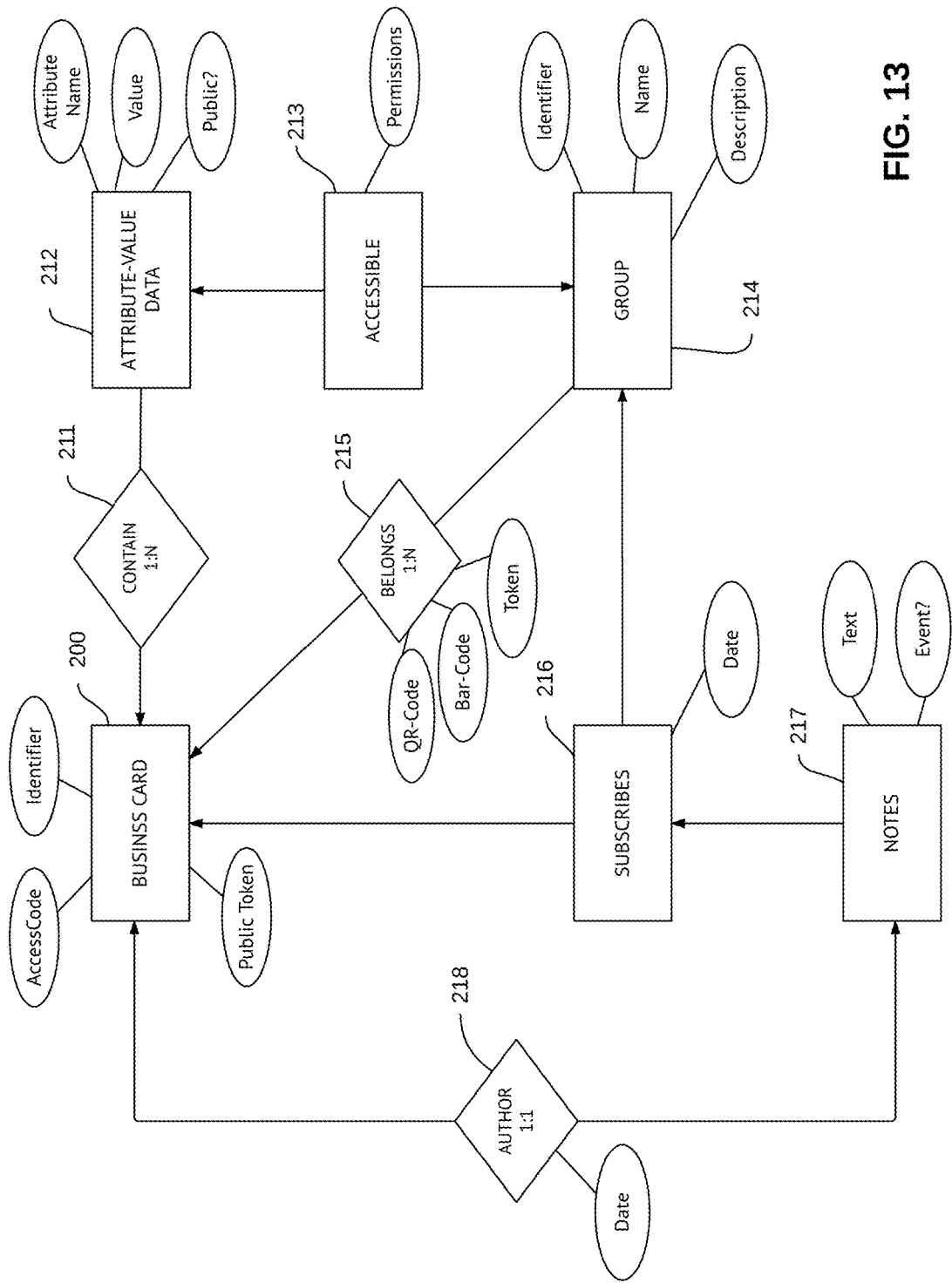
FIG. 13 is an Entity Relationship Diagram depicting the schema of a relational database used for capturing group permissions on attributes.

FIG. 13 is an Entity Relationship Diagram depicting the schema of a relational database used for capturing group permissions on attributes. As illustrated a Business Card Entity 200 may contain many pieces of contact information. Thus, the Contains Relationship 211 is between Business Card Entity 200 and Attribute-Value Entity 212 and has a cardinality of one-to-many (1:N). The Attribute-Value Entity 212 contains instances of specific attributes name and their values for the associated instance of the Business Card Entity 200. Thus, the contact information for a Card Owner 100 is stored in the associated instances of Attribute-Value Entity 212. The Accessible Entity 213 is an intersection entity as cardinality of relationship between Attribute-Value Entity 212 and Group Entity 214 is many to many (M:N) and thus is modeled by introducing an intersection entity. In an embodiment of the invention the Card Owner 100 defines specific permissions which allow the subscribing group members to alter the values stored in the Attribute-Value Entity 212. A business card may be subscribed by many groups, and a group may contain many business cards. Correspondingly, the relationship between Business Card Entity 200 and Group Entity 214 is a many to many (M:N) relationship and is modeled using Subscribes Entity 216 which is thus an intersection entity. The Database 154 allows users for taking a plurality of notes and events with every subscription. These notes are modeled using Notes Entity 217—with each note having the potential for being designated as an event. Furthermore, each instance stored in the Notes Entity 217 has a unique author or the creator of the note as captured by the one-to-one (1:1) Author Relationship 218.

Referring again to FIG. 13 it should be noted that the Group Entity 214 has implicit ownership as defined by the Belongs Relationship 215. This is a one-to-many (1:N) relationship implying that a many Group Entity 214 belong to a given Business Card Entity 200. Thus, in this relationship the Business Card Entity 200 is really the Card Owner 100, and associated with each of these groups is a Business Card Token 405 with many types of tokens (QR-Code or Bar-Code) shown as the attributes of Belongs Relationship 215. Since each of the instances of the Group Entity 214 has a unique instance of Business Card Entity 200 associated with it, the Subscribes Entity 216 thus links that one unique entity instance to many the subscribers. In this manner, the recipient or subscription relationship is created through the Group Entity 214 which in turn has its visibility to the attributes of card owner defined by the Accessible Entity 213. Furthermore, when instances of the Notes Entity 217 are defined they also have a unique owner and recipient associated with it. Business rules enforced on the Database 154 will ensure that the author of the note is either the owner or the subscriber, and that the note is visible and editable by the author only. Business rules will also execute the functionality of the actions that need to be taken when the conditions of an event become valid.

An embodiment of the invention uses a computer-implemented method for editing an electronic business card wherein the instructions include an edit-command for creating a group; and upon accepting the transaction request, the computing server further performing the steps comprising of—creating a group record in the memory having a group number, creating a link record in the memory having a parent identifier and a child identifier wherein the parent identifier is the database account number and the child identifier is the group number, saving the group record to the database, and saving the link record to the database.

An embodiment of the invention uses a computer-implemented method for adding a member having a member number to a group having a group number where the group number is associated with the user account number; and upon accepting the transaction request, the computing server further performing the steps comprising of—creating a link record in the memory having a parent identifier and a child identifier wherein the parent identifier is the group number and the child identifier is the member number; and saving the link record to the database.

An embodiment of the invention uses a computer-implemented method for adding a note wherein the note includes a note text and a member account number; and upon accepting the transaction request, the computing server further performing the steps comprising of—creating, a note record in the memory having a parent identifier, child identifier, and a text field, assigning, the parent identifier as the user account number, the child identifier as the member account number, and the text field as the note text, and saving, from memory to the database, the note record.

An embodiment of the invention uses a computer-implemented method for adding a note wherein the note includes a note text and a member account number identifying an object of the note; and upon accepting the transaction request, the computing server further performing the steps comprising of—creating, a note record in the memory having a parent identifier, child identifier, and a text field, assigning, the parent identifier as the user account number, the child identifier as the member account number identifying the object of the note, and the text field as the note text, and saving, from memory to the database, the note record.

An embodiment of the invention uses a computer-implemented method for adding an event wherein the event includes an event text, an event time, an event action, and a member account number, and the computing server includes a list with plurality of action items for with each action item set for execution at an action time; and upon accepting the transaction request, the computing server further performing the steps comprising of—creating, an event record in the memory having a parent identifier, child identifier, a text field, a time field, and an action field, assigning, the parent identifier as the user account number, the child identifier as the member account number, the text field as the event text, the time field as the event time, and the action field as event action, processing, the event record and adding event action to the computing server's action list with action execution set to the event time, saving, from memory to the database, the event record.

Figure 14:
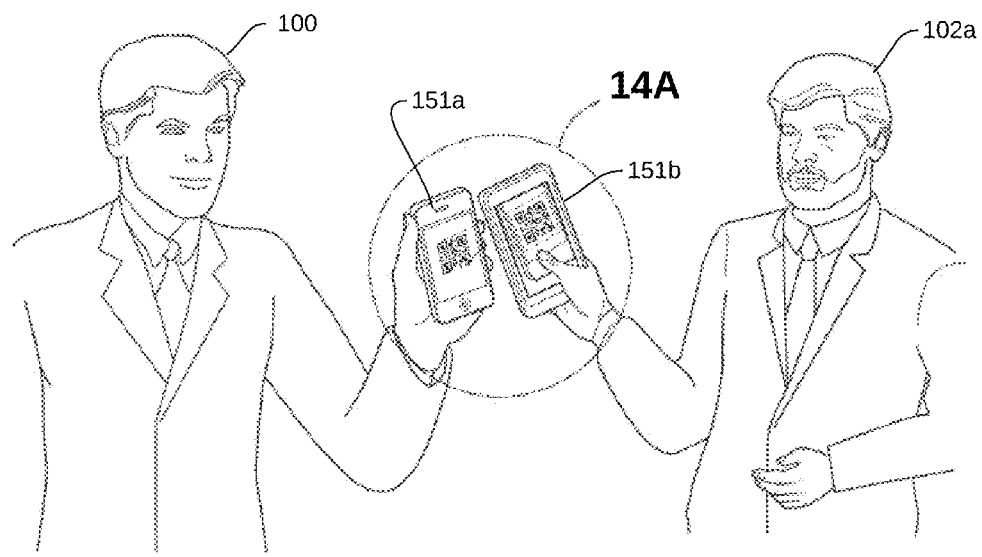
FIG. 14 is an environmental view with FIG. 14A showing a detailed view of a card owner sharing a first electronic business card meant for a first group.
Figure 14A:
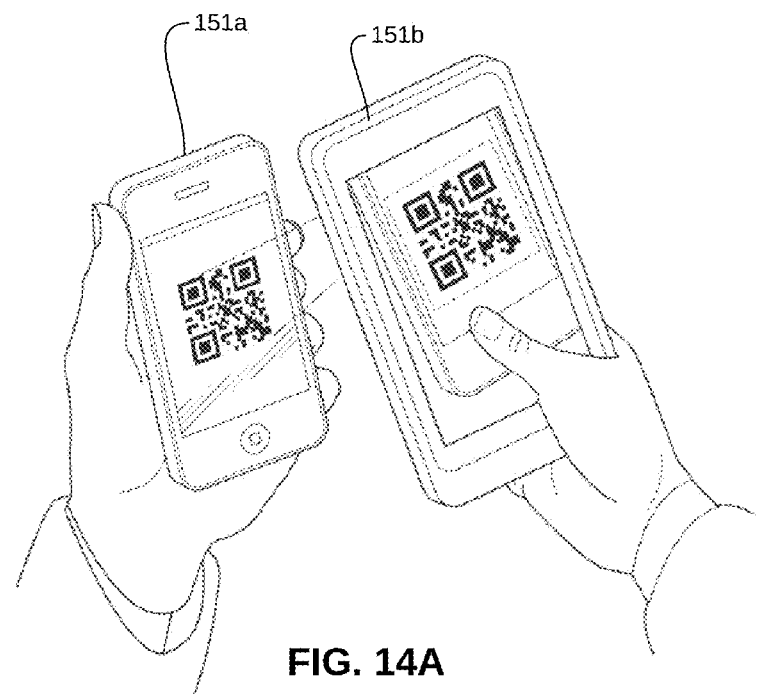
Figure 15:
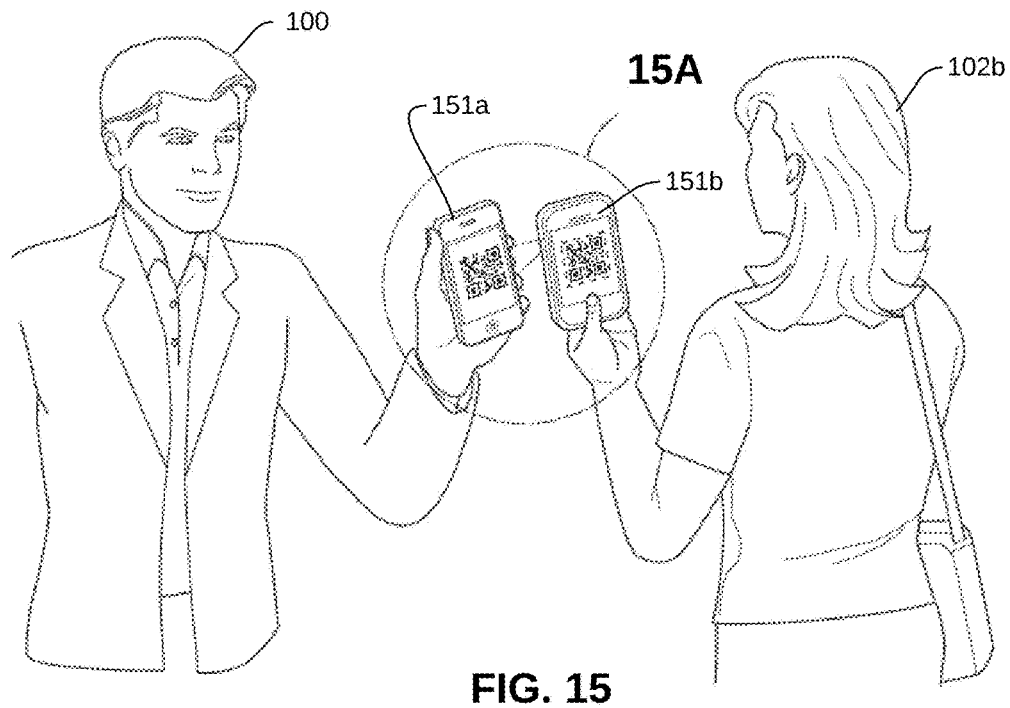
FIG. 15 is an environmental view with FIG. 15A showing a detailed view of a card owner sharing a second electronic business card meant for a second group.
Figure 15A:
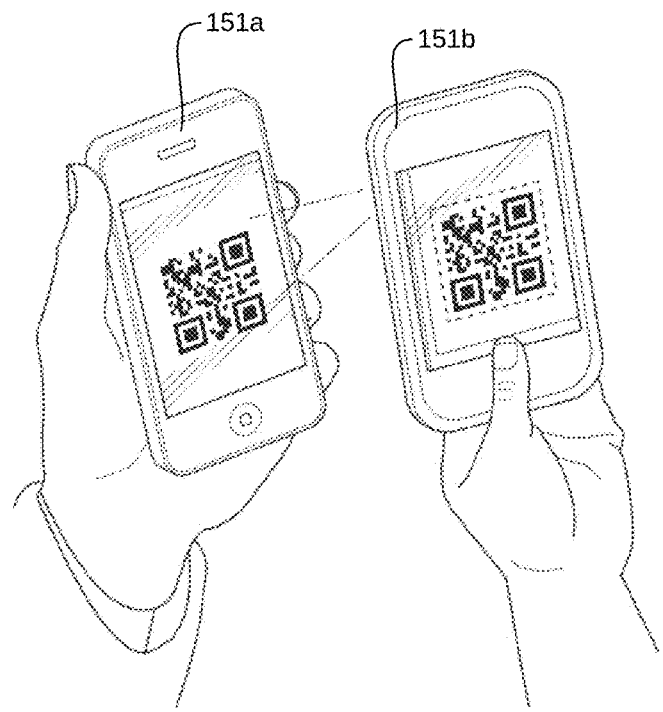

FIGS. 14 and 15 are two environmental views where a Card Owner 100 is sharing his Electronic Business Card 400 with members of two different groups. As shown in FIGS. 14A and 15A respectively, two different Business Card Token 405s are used for sharing information. Thus, while Card Owner 100 has all their data in one centralized Database 154 to which the group members will link in their electronic address book, they will both be able to view only subset of centrally stored card information.

Figure 16:
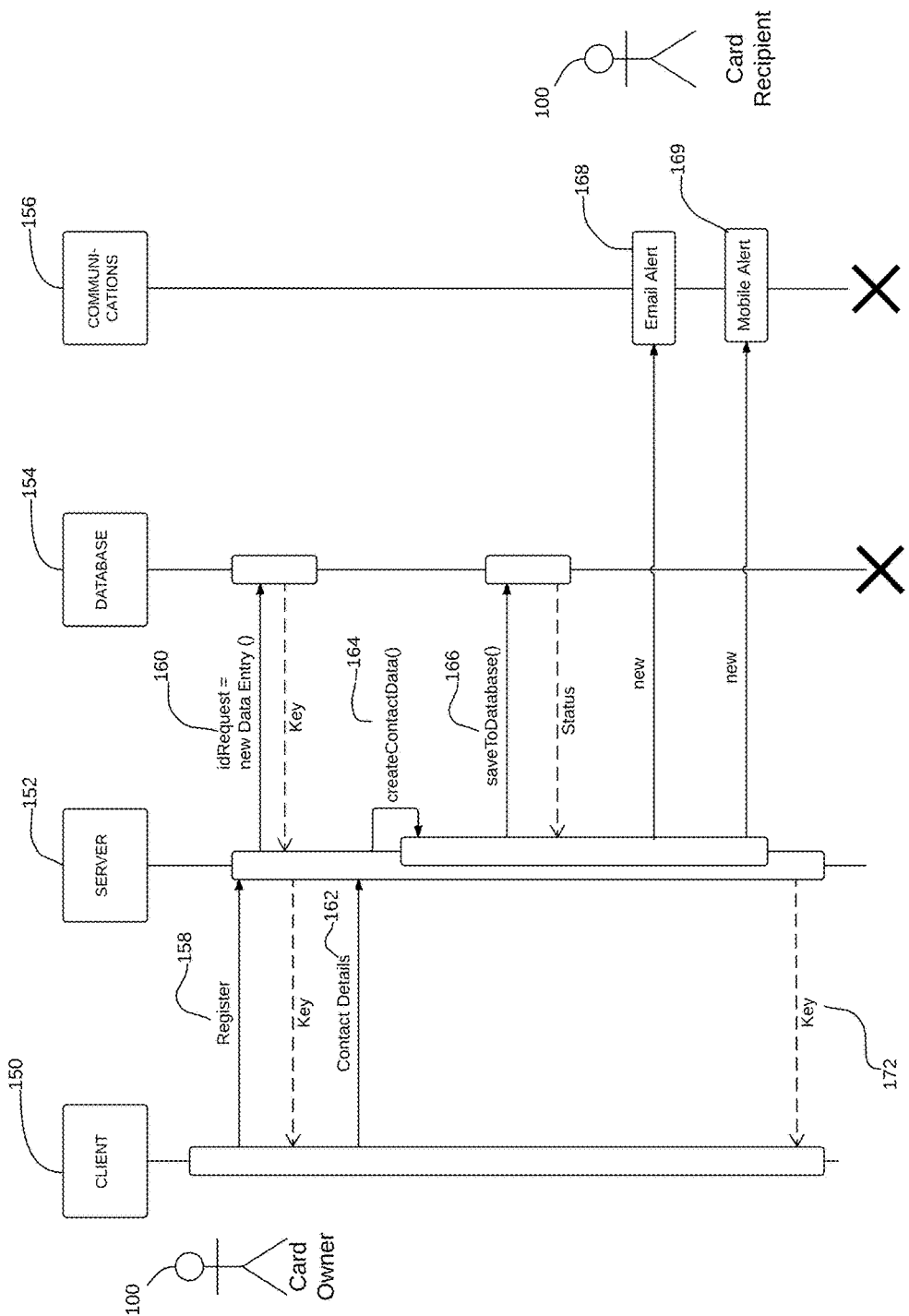
FIG. 16 is software sequence diagram depicting the interaction between a Client Device 150 and a Server 152 computer, and a Database 154, and a Communication System 156 managed by the Server 152 computer whereby a Card Owner 100 creates and distributes an Electronic Business Card 400.

FIG. 16 is a sequence diagram for an embodiment of the invention which augments sequence diagram presented in FIG. 4, as well as the description previously contained in paragraphs 0 through [0059] incorporated herein. This embodiment of the invention augments FIG. 4 and its associated description by including a Communication System 156 for sending Business Card Token 405 to recipients as notifications with a token linking to the sender's Electronic Business Card 400. The token notification is made through an Email Alert 168 or a Mobile Phone Alert 169.

An embodiment of the invention uses a computer-implemented method for creating link between a subscribing user and an electronic business card, where the subscribing user and the electronic business card each has an associated account number with a card management system, the method comprising: receiving, by a subscribing user's computer device, an input identifying token for an electronic business card to link with the subscribing user; communicating, by the subscribing user's computer device, a linking transaction request that includes the subscribing user account number and the identifying token for an electronic business card, to the card management system wherein the card management system includes a computing server, a memory, and a database comprising of a plurality of electronic business cards where each of the plurality of electronic business cards has an associated database account number, an identifying token, and plurality of contact information items; determining, by the computing server, if the subscribing user account number matches an account number for a first electronic business card, and the identifying token matches an identifying token for a second electronic business card stored in the database; rejecting, by the computing server, the linking transaction request when computing server does not find either the first electronic business card or the second electronic business card; accepting, by the computing server, the linking transaction request when computing server finds both the first electronic business card and the second electronic business card, whereupon having the computing server further perform the steps comprising—retrieving, from the database into memory, the first account number for the first electronic business card, retrieving, from the database into memory, the second account number for the second electronic business card, creating a link record in the memory having a parent identifier and a child identifier wherein the parent identifier is the second account number and the child identifier is the first account number, saving the link record to the database; creating, by the computing server, a status code having a first value when rejecting the linking transaction request, and having a second value when accepting the linking transaction request; and communicating, by the computing server, the status code to the subscribing user computer device.

An embodiment of the invention uses a computer-implemented method for creating link between a subscribing user and an electronic business card wherein the subscribing user's computer device includes a device display surface; and upon accepting the linking transaction computing server further performing the steps comprising of—retrieving, from the database into memory, a plurality of contact information items associated with the second electronic business card; communicating, by the computing server, the plurality of contact information items to the subscribing user computer device; and displaying, by the subscribing user computer device, the plurality of contact information items by delivering the same to the device display surface.

An embodiment of the invention uses a computer-implemented method for creating link between a subscribing user and an electronic business card wherein each of the plurality of contact information items of the electronic business has an associated attribute determining the subscribing user's permission to the contact information item, the method further comprising—classifying, by the computing server, each of the plurality of contact information items into a first class if the account number of the subscribing user has permission to a contact information item, otherwise classifying the contact information item into a second class; communicating, by the computing server, the plurality of contact information items the first class to the subscribing user computer device.

An embodiment of the invention uses a computer-implemented method for creating link between a subscribing user and an electronic business card where the database includes a group record associated with the subscribing user, wherein each the plurality of contact information items of the electronic business has an associated attribute determining the group's permission to the contact information item, the method further comprising—classifying, by the computing server, each of the plurality of contact information items into a first class if the group has access to the contact information item, otherwise classifying the contact information item into a second class; communicating, by the computing server, the plurality of contact information items the first class to the subscribing user computer device.

Figure 17:
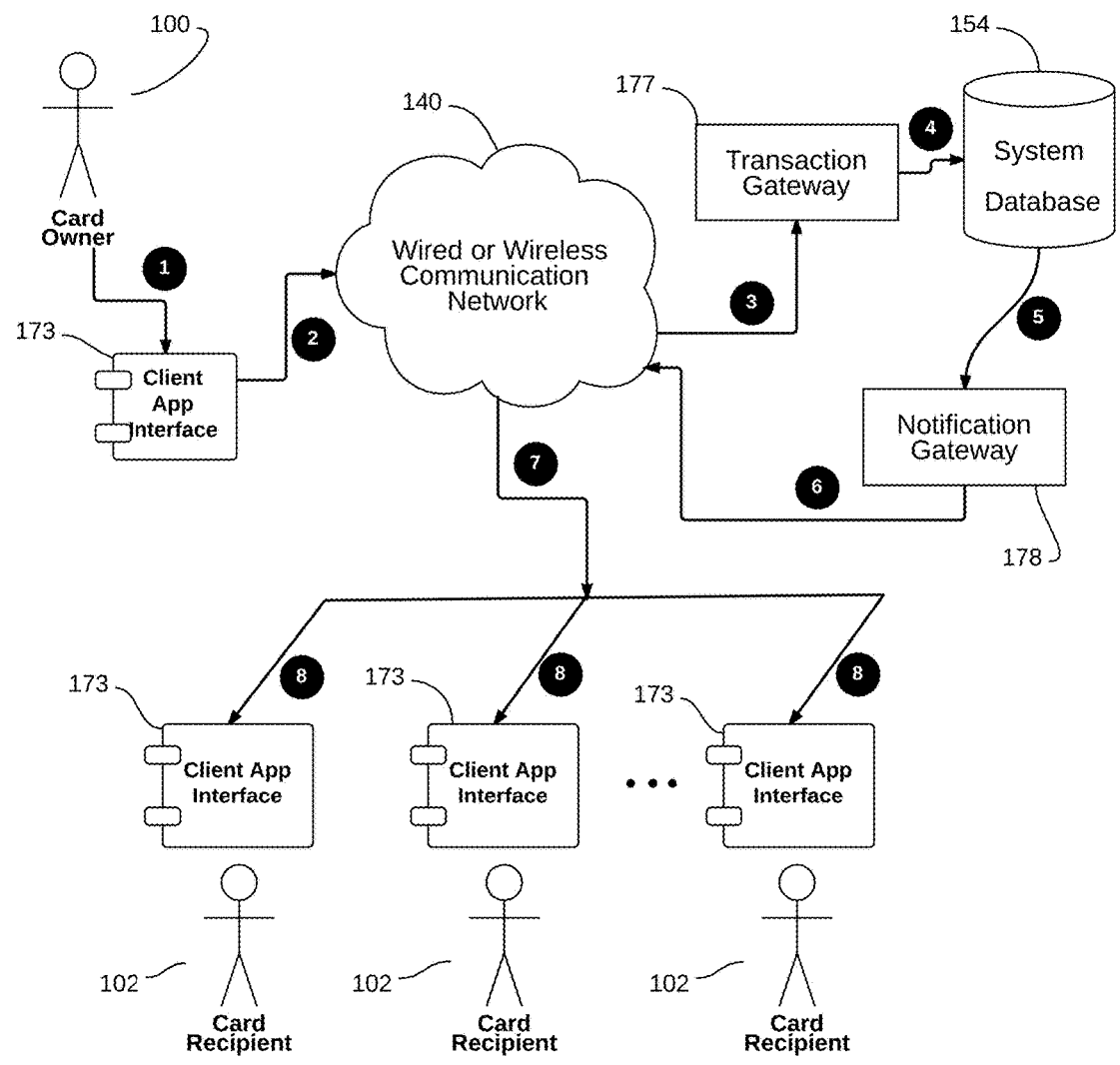
FIG. 17 depicts the flow of data illustrating the push notifications effect of the card owner making a change in their electronic business card.

Push Notifications:

FIG. 17 depicts the flow of data illustrating the effect of the Card Owner 100 making a change in their Electronic Business Card 400. The Card Owner 100 makes a change to their Electronic Business Card 400 by the use of a client application—from a mobile, desktop or a web client—using a Client Desktop App 172 in the embodiment illustrated. Both the Client Desktop App 172 and the Client Mobile App 170 implement a Client App Interface 173 which provides a uniform interface from a variety of devices connected to wired and wireless networks such devices including but not limited to mobile phones, tablets, desktops, browser applications, etc. The Client App Interface 173 communicates this change request to a Transaction Gateway 177. The Transaction Gateway 177 is a software server component executing on the Server 152 and responsible for ensuring that all transactional requests made to Database 154 are atomic and durable and thus do not result in any database anomalies or lead to data integrity violations. The flow of information is sequenced with label on each of data flow are labelled 1 through 8.

Referring again to FIG. 17, any changes made by the Card Owner 100 are propagated through the Network 140 to the Transaction Gateway 177. The Transaction Gateway 177 resolves the update requests and makes the changes permanent by writing them to the Database 154. Changes made to Database 154 cause a notification trigger to execute whereby the Notification Gateway 178—another server software component executing on Server 152—is invoked. The Notification Gateway 178 is an optimized to enhance throughput and cater to a variety of clients opting in to receive notification when changes are made to a Electronic Business Card 400 stored in the Database 154. The Notification Gateway 178 is a transaction-less component and optimized for high performance. In an embodiment of the invention, the Notification Gateway 178 pushes the data through the Network 140 to a plurality of Client App Interface 173 on devices owned by a plurality of Card Recipient 102. The Client App Interface 173 on each of the recipient devices is informed about the changes made by the Card Owner 100 to their Electronic Business Card 400. The Client App Interface 173 subsequently fetches the card data if requested for viewing by Card Recipient 102. These push notifications are particularly suited for subscribers in a group who need to have updated values for the contact information is important to prevent group members in a team of workers who may not rely on their memory to use outdated information and show up at the incorrect office address, for example. The push notification feature of the Card Management System 500 provides these notifications in a real-time manner to override any inconsistent information that the Card Recipient 102 may incorrectly rely upon.

An embodiment of the invention uses a computer-implemented method for modifying of the plurality of contact information items, wherein the database includes a group record associated with the user account number and where the group record includes a plurality of link records with each link record having a member account number; and upon accepting the transaction request, the computing server further performing the steps comprising of—retrieving, from the database into memory, a contact record of the electronic business card for the matching database account number; processing, the edit-command and modifying the contact record in memory using the plurality of editing-data items; retrieving, from the database into memory, the group record associated with the user account number; retrieving, from the database into memory, the plurality of link records associated with the group record; retrieving, from the database into memory, a plurality of group member contact records using the member account number included in each of the plurality of link records; preparing, in memory, a summary of changes made to the contact record for the user; communicating, the summary of changes to the plurality of group members using a predetermined method of communication; and saving, from memory to database, the modified contact record. In an embodiment of the invention the method for communication for the summary of changes is through an electronic-mail message or short-text-message or both.

In an embodiment of the invention the group member has a member computing device running an application program capable of receiving notifications, and where the method for communication comprises of sending notification to the application program on the member computing device.

As will be appreciated by one of skill in the art, the present invention may be embodied as a method such as a computer-implemented process or an apparatus such as a system, machine, device, computer program product, or a combination of the foregoing. Accordingly, embodiments of the present invention may take the form of an entirely hardware embodiment, an entirely software embodiment or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in any language procedural, functional, declarative, object oriented, scripted or unscripted programming language such as C, Prolog, C#, Java, Perl, Smalltalk, C++, or the like.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wired-lines, optical fiber cable, radio frequency (RF) signals, or other mediums.

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While embodiments of the present invention are described above with reference to illustrative drawings, it will be understood that each illustrations or a portion thereof can be implemented by computer-executable program code portions. These computer-executable program code portions may be provided to a processor of a general purpose computer, special purpose computer, or other programmable data processing apparatus to produce a particular machine. It will be understood that steps of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for editing an electronic business card, the method comprising: generating, by a client device, a transaction request including instructions to edit the electronic business card identified by an account number or a key wherein client device does not store the electronic business card but instead communicates instructions to a card management system wherein the electronic business card data is stored where the electronic business card data includes a plurality of subscribers; communicating, by the client device, the transaction request to a card management system wherein the card management system includes a computing server, a memory, a notification gateway adapted to send push notifications to the plurality of subscribers, and a database comprising of a plurality of electronic business cards each having an associated account number, a card owner, and a plurality of contact information items wherein each contact information item is granted a permission by the card owner for access by one or more of a plurality of groups with each group having an associated QR-Code, a Bar-Code, or an Alphanumeric-Code; receiving the transaction request by the card management system; determining, by the computing server, whether the account number in the transaction request equals a matching database account number where the matching database account number is an account number of one of the plurality of the electronic business cards stored in the database; rejecting, by the computing server, the transaction request when computing server does not find the matching database account number; accepting, by the computing server, transaction request when computing server finds the matching database account number, whereupon computing server performs the additional steps comprising: retrieving, from the database into memory, a contact record of the electronic business card for the matching database account number, applying, to the contact record in memory, the edit-commands and the plurality of editing data items included the transaction request, and saving, from memory to the database, the contact record; creating, by the computing server, a status code having a first value when rejecting the transaction request, and having a second value when accepting the transaction request; sending, by the notification gateway push notification to the plurality of subscribers; and communicating a response code to the client device.

2. A computer-implemented method for editing an electronic business card of claim 1 wherein the instructions include a value and a permission setting for a plurality of contact information items for a new electronic business card; and upon accepting the transaction request, the computing server further performing the steps comprising of: creating, in the memory, a new contact record including an account number field; setting the account number field equal to the account number in the transaction request; assigning the plurality of contact information items to the new contact record and setting contact item permission as provided in the instructions; and saving the new contact record to the database.

3. A computer-implemented method for creating an electronic business card of claim 2 wherein plurality of contact information items are defined as <attribute, value> pairs wherein the permission settings are associated with the attributes of each of the plurality of <attribute, value> pairs.

4. A computer-implemented method for editing an electronic business card of claim 1 wherein the instruction includes an edit-command for creating or replacing electronic business card token with a predefined permission setting; and upon accepting the transaction request and retrieving the contact record into memory, the computing server further performing the steps comprising of: generating, using data from the contact record in memory, a new code as the business card token wherein the code is a QR-Code, a Bar-Code, or an Alphanumeric-Code wherein the code includes the permission setting; augmenting the contact record with the new code or by replacing an existing code of the contact record with the new code; and saving, into the database, the augmented contact record.

5. A computer-implemented method for editing an electronic business card of claim 1 wherein the instructions include creating a group with a predefined permission setting; and upon accepting the transaction request, the computing server further performing the steps comprising of: creating a group record in the memory having a group number wherein the group record includes a permission setting and is adapted to contain a plurality of electronic business card keys, creating a link record in the memory having a parent identifier and a child identifier wherein the parent identifier is the key in the transaction request and the child identifier is the group number, saving the group record to the database, and saving the link record to the database.

6. A computer-implemented method for editing an electronic business card of claim 1 wherein the instructions include adding a member electronic business card having a member key to a group having a group record in the database identified by a group number; and upon accepting the transaction request, the computing server further performing the steps comprising of: retrieving, by the computing server, the group record associated with the group number wherein the group record is further includes a parent identifier and adapted to link to a plurality of member card keys; accepting, by the computing server, the transaction request when the parent identifier in the group record matches the account number in the transaction; and upon accepting the transaction request: creating adding a new link between to the plurality of links in the group record where the new link points to the member key and the record in the memory having a parent identifier and a child identifier wherein the parent identifier is the group number and the child identifier is the member number; and saving the link group record to the database.

7. A computer-implemented method for editing an electronic business card of claim 1 wherein the instructions include an edit-command for adding a note record wherein the edit command includes a note text and a note target key; and upon accepting the transaction request, the computing server further performing the steps comprising of: creating, a note record in the memory wherein the note record is adapted to include a note text field, a note-owner key, and a note-reference key, copying the edit command note text into the note text field, setting the note-owner key equal to the transaction request key, setting the note-reference key equal to the note target key of the edit command, and saving, from memory to the database, the note record.

8. A computer-implemented method for editing an electronic business card of claim 1 wherein the instructions include an edit-command for creating an event wherein the edit-command includes an event text, an event time, an event action, and a member key with the computing server including a list with plurality of action items with each action item set for execution at an action time; and upon accepting the transaction request, the computing server further performing the steps comprising of: creating, an event record in the memory having a parent identifier, child identifier, a text field, a time field, and an action field, assigning, the parent identifier as the transaction key, the child identifier as the member account key, the text field as the event text, the time field as the event time, and the action field as event action, processing, the event record and adding event action to the computing server's action list with action execution set to the event time, and saving, from memory to the database, the event record.

9. A computer-implemented method for editing an electronic business card of claim 1 wherein the instructions include an edit-command for modifying the plurality of contact information items, wherein the database includes a group record associated with the user account number and where the group record having a push notification flag and including a plurality of link records with each link record having a member account number; and upon accepting the transaction request, the computing server further performing the steps comprising of: retrieving, from the database into memory, a contact record of the electronic business card for the matching database account number; processing, the edit-command and modifying the contact record in memory using the plurality of editing-data items; retrieving, from the database into memory, the group record associated with the user account number; retrieving, from the database into memory, the plurality of link records associated with the group record; retrieving, from the database into memory, a plurality of group member contact records using the member account number included in each of the plurality of link records; preparing, in memory, a summary of changes made to the contact record for the user; communicating, the summary of changes to the plurality of group members using a predetermined method of communication; and saving, from memory to database, the modified contact record.

10. A computer-implemented method for editing an electronic business card of claim 9 where the method for communication for the summary of changes is through an electronic-mail message or short-text-message or both.

11. A computer-implemented method for editing an electronic business card of claim 9 where a group member has a member computing device running an application program capable of receiving notifications, and where the method for communication comprises of sending notification to the application program on the member computing device.

12. A computer-implemented method for retrieving an electronic business card, the method comprising: receiving, by a user computer device, a request to retrieve an electronic business card including a plurality of subscribers wherein the request includes a token used for identifying the electronic business card and a permission designation for the request; communicating, by the user computer device, the request to a card management system wherein the card management system includes a computing server, a memory, a notification gateway adapted to send push notifications to the plurality of subscribers, and a database comprising of a plurality of electronic business cards each having an associated account number, a card owner, a card-token, and a plurality of contact information items wherein each contact information item is granted a permission by the card owner for access by one or more of a plurality of groups with each group having an associated QR-Code, a Bar-Code, or an Alphanumeric-Code; matching, by the computing server, the token in request to each of the card-token for the plurality of the electronic business cards stored in the database; rejecting, by the computing server, the request when computing server does not find a matching database card-token; accepting, by the computing server, the request when computing server finds the matching database card-token, whereupon computing server performing the steps comprising: retrieving, from the database into memory, the plurality of contact information items for the electronic business card for the matching database card-token wherein each of contact information item has a permission designation, classifying, by the computing server, each of the plurality of contact information items into a first class if the contact information item has a permission designation of public, or if the permission of the contact information item matches the permission designation in the request, and communicating, from the memory to the user computer device, the plurality of contact information items included in the first class; creating, by the computing server, a status code having a first value when rejecting the retrieve request, and having a second value when accepting the retrieve request; and communicating, by the computing server, the response code to the user computer device.

13. A computer-implemented method for retrieving an electronic business card of claim 12 wherein the request used for identifying an electronic business card is a QR-Code, a Bar-Code, or an Alphanumeric-Code.

14. A computer-implemented method for retrieving an electronic business card of claim 12 wherein the request used for identifying an electronic business card comprises of the database account number of a requesting user having a permission designation stored in the database and the request permission level is set to the permission designation of the requesting user.

15. A computer-implemented method for retrieving an electronic business card of claim 12 wherein the user computer device is a web browser.

16. A computer-implemented method for retrieving an electronic business card of claim 12 wherein each of the plurality of each of the plurality of contact information items of the electronic business has an associated attribute determining the user computer device's permission to the contact information item, the method further comprising: classifying, by the computing server, each of the plurality of contact information items into a first class if the user has access to the contact information item, otherwise classifying the contact information item into a second class; communicating, by the computing server, the plurality of contact information items the first class to the user computer device.

17. A computer-implemented method for creating a link between a subscribing user and an electronic business card, where the subscribing user and the electronic business card each has an associated account number with a card management system, the method comprising: receiving, by a subscribing user's computer device, an input identifying token for an electronic business card to link with the subscribing user; communicating, by the subscribing user's computer device, a linking transaction request that includes the subscribing user account number and the identifying token for an electronic business card, to the card management system wherein the card management system includes a computing server, a memory, a notification gateway adapted to send push notifications to a plurality of subscribers, and a database comprising of a plurality of electronic business cards where each of the plurality of electronic business cards has an associated database account number, a card owner, an identifying token, and plurality of contact information items wherein each contact information item is granted a permission by the card owner for access by one or more of a plurality of groups with each group having an associated QR-Code, a Bar-Code, or an Alphanumeric-Code; determining, by the computing server, if the subscribing user account number matches an account number for a first electronic business card stored in the database, and the identifying token matches an identifying token for a second electronic business card stored in the database; rejecting, by the computing server, the linking transaction request when computing server does not find either the first electronic business card or the second electronic business card; accepting, by the computing server, the linking transaction request when computing server finds both the first electronic business card and the second electronic business card, whereupon having the computing server further perform the steps comprising: retrieving, from the database into memory, the second account number for the second electronic business card, creating a link record in the memory having a parent identifier and a child identifier wherein the parent identifier is the second account number and the child identifier is the subscribing user account number, and saving the link record to the database.

18. A computer-implemented method for creating a link between a subscribing user and an electronic business card of claim 17 wherein the subscribing user's computer device includes a device display surface; and upon accepting the linking transaction computing server further performing the steps comprising of: retrieving, from the database into memory, a plurality of contact information items associated with the second electronic business card that have a permission designation of public; communicating periodically, by the computing server, the plurality of contact information items to the subscribing user computer device when a change is made to the second electronic business card; and displaying, on the subscribing user computer device display surface, the plurality of contact information items by delivering the same to the device display surface.

19. A computer-implemented method for creating a link between a subscribing user and an electronic business card of claim 18 wherein each of the plurality of contact information items of the electronic business has an associated attribute determining the subscribing user's permission to the contact information item, the method further comprising: classifying, by the computing server, each of the plurality of contact information items into a first class if the account number of the subscribing user has permission to a contact information item, otherwise classifying the contact information item into a second class; communicating, by the computing server, the plurality of contact information items in the first class to the subscribing user computer device.

20. A computer-implemented method for creating a link between a subscribing user and an electronic business card of claim 17 where the database includes a group record associated with the subscribing user, wherein each the plurality of contact information items of the electronic business has an associated attribute determining the group's permission to the contact information item, the method further comprising: classifying, by the computing server, each of the plurality of contact information items into a first class if the group has access to the contact information item, otherwise classifying the contact information item into a second class; communicating, by the computing server, the plurality of contact information items the first class to the subscribing user computer device.

21. A computer-implemented method for creating link between a subscribing user and an electronic business card of claim 17 wherein the link record also includes a geographical location information of the subscribing user.

* * * * *